US006953345B1

(12) United States Patent
Nakashima et al.

(10) Patent No.: US 6,953,345 B1
(45) **Date of Patent: *Oct. 11, 2005**

(54) WATER-METACHROMATIC CLOTH SHEET, TOY SET USING THE SAME, AND WRITING INSTRUMENT FOR WATER-METACHROMATIC MEMBERS

(75) Inventors: Akio Nakashima, Nagoya (JP); Takao Kani, Nagoya (JP)

(73) Assignee: The Pilot Ink Co., Ltd., Aichi-ken (JP)

( * ) Notice: Subject to any disclaimer, the term of this patent is extended or adjusted under 35 U.S.C. 154(b) by 41 days.

This patent is subject to a terminal disclaimer.

(21) Appl. No.: 09/679,341

(22) Filed: Oct. 4, 2000

(30) Foreign Application Priority Data

Oct. 5, 1999 (JP) ................................ 11-284005

(51) Int. Cl.[7] .......................... B43L 1/00; G09B 11/10
(52) U.S. Cl. ........................................ 434/408; 434/81
(58) Field of Search ............................ D19/36, 35, 37, D19/38, 39, 40; 503/200, 204, 205, 207, 503/213; 401/199, 202; 434/391; 428/313.9, 428/29, 317.1, 317.9, 331

(56) References Cited

U.S. PATENT DOCUMENTS

| | | | | |
|---|---|---|---|---|
| 2,740,979 | A * | 4/1956 | Bridy | 401/198 |
| 3,421,823 | A * | 1/1969 | Matsumoto | 401/199 |
| 3,463,597 | A * | 8/1969 | Wakai | 401/206 |
| 3,993,409 | A * | 11/1976 | Hart | 401/199 |
| 4,022,211 | A | 5/1977 | Timmons et al. | |
| 4,028,118 | A * | 6/1977 | Nakasuji et al. | 106/31.19 |
| 4,065,215 | A * | 12/1977 | Otsuka | 401/199 |
| 4,212,393 | A * | 7/1980 | Lenkoff | 206/575 |
| 4,681,791 | A * | 7/1987 | Shibahashi et al. | 428/96 |
| 4,810,562 | A * | 3/1989 | Okawa et al. | 428/199 |
| 5,011,445 | A * | 4/1991 | Nakasuji et al. | 446/14 |
| 5,163,846 | A * | 11/1992 | Lee | 434/408 |
| 5,219,625 | A * | 6/1993 | Matsunami et al. | 428/30 |
| 5,451,114 | A * | 9/1995 | Ishigaki | 401/202 |
| 5,641,078 | A * | 6/1997 | Kaufmann | 211/69.4 |
| 5,814,579 | A * | 9/1998 | Dotson et al. | 106/31.16 |
| 5,858,914 | A * | 1/1999 | Shibahashi et al. | 503/201 |
| 5,865,553 | A * | 2/1999 | Flye Sainte Marie et al. | 401/142 |
| 5,906,446 | A * | 5/1999 | McCulloch et al. | 401/199 |
| 5,958,525 | A * | 9/1999 | Green et al. | 428/14 |
| 6,228,804 | B1 * | 5/2001 | Nakashima | 503/226 |
| 6,244,774 | B1 * | 6/2001 | Barosso et al. | 401/198 |
| 6,263,602 | B1 * | 7/2001 | Seiber et al. | 40/606 |
| 6,364,993 | B1 * | 4/2002 | Netsch et al. | 156/277 |
| 6,416,853 | B1 | 7/2002 | Nakashima et al. | 428/313.9 |

FOREIGN PATENT DOCUMENTS

| | | | | |
|---|---|---|---|---|
| EP | 0 776 645 | | 6/1997 | |
| EP | 0 919 604 | | 6/1999 | |
| JP | 02-074688 | * | 3/1990 | D06Q 1/00 |

* cited by examiner

*Primary Examiner*—Derris H. Banks
*Assistant Examiner*—Dmitry Suhol
(74) *Attorney, Agent, or Firm*—Fitzpatrick, Cella, Harper & Scinto

(57) ABSTRACT

A water-metachromatic sheet has a support with a porous layer containing a binder resin with dispersed fine-particle silicic acid. The sheet is capable of rendering different transparency between water absorbed and unabsorbed states. The support is a cloth having a weight per unit area of 30 $gm^2$ to 1,000 $gm^2$, the fine-particle silicic acid is contained in an amount of from 1 $gm^2$ to 30 $gm^2$, and the fine-particle silicic acid is incorporated in an amount from 0.5 to 2 parts by weight based on 1 part by weight of the binder resin.

14 Claims, 19 Drawing Sheets

WATER-METACHROMATIC CLOTH SHEET, TOY SET USING THE SAME, AND WRITING INSTRUMENT FOR WATER-METACHROMATIC MEMBERS

This application claims the benefit of Japanese Application No. 11-284005 which is hereby incorporated by reference.

BACKGROUND OF THE INVENTION

1. Field of the Invention

This invention relates to a water-metachromatic cloth sheet, a toy set making use of the same and a writing instrument for water-metachromatic members. More particularly, it relates to a water-metachromatic cloth sheet capable of assuming different aspects depending on whether it stands dry or stands wet with water, a toy set making use of such a sheet, and a convenient writing instrument for water-metachromatic members which enable formation of any desired handwriting images by means of water, on water-metachromatic members capable of assuming such alternately changeable aspects.

In the present invention, a white or colored opaque sheet turns colorless or transparent, and vice versa, depending on whether it is dry or wet. This is also regarded as a change in color, i.e., metachromatism.

2. Related Background Art

Sheets comprising a support and provided thereon a porous layer containing a pigment having a low refractive index, to the porous layer of which water is made to adhere to make it transparent to cause an image to appear, are conventionally known as disclosed in Japanese Patent Publications No. Sho50-5097 and No. Hei5-15389.

As fields to which such sheets are chiefly applied, they are conventionally applied to practice of calligraphy, image appearing-disappearing toys and so forth, and are mostly comprised of paper as the support or substrate, having a poor durability.

U.S. Pat. No. 5,163,846 discloses a water-reactive sheet of this type and a water pen with which one can write on the sheet, but does not disclose any specific construction of water pens that can satisfy practical usability.

SUMMARY OF THE INVENTION

The present inventors have discovered that a cloth having a specific weight per unit area may be used as a support, and a porous layer formed of a mixture of a pigment having a specific low refractive index with a binder resin in a specific proportion may be formed on the surface of the support, whereby sharp through-view images can be made to appear and also the shortage in durability in the prior art can be eliminated.

An object of the present invention is to provide a water-metachromatic cloth sheet having superior flexural strength, scratch resistance, water resistance and so forth, which is usable as a general-purpose water-metachromatic writing sheet as a matter of course and also as a water-metachromatic sheet having an area large enough for infants or someone else to step thereon to form water-metachromatic images as desired, and is also applicable to fields of toys such as doll clothing and stuffed toy's skin materials, fields of swimsuit and other fields of artificial flowers, umbrellas, raincoats, rainproof shoes and so forth.

Another object of the present invention is to provide a toy set used in combination with a water-providing means having the form of a stamp or the form of a writing instrument, which can form water-metachromatic images on the above water-metachromatic sheet.

Still another object of the present invention is to provide a writing instrument with which a sharp water image can be formed while water is allowed to flow out in an appropriate quantity in accordance with writing speed and also which can show a proper-quantity water flow-out performance even in writing in the state where the pen point is kept upward or kept sideway.

A further object of the present invention is to provide as the above writing instrument a writing instrument for water-metachromatic members which is readily suppliable with water and satisfies practical usability.

To achieve the above objects, the present invention provides a water-metachromatic cloth sheet which comprises a support and provided on the surface thereof a porous layer formed of a binder resin to which fine-particle silicic acid stands fixed dispersedly, and is capable of rendering different transparency between a liquid-absorbed state and a liquid-unabsorbed state, wherein;

the support is a cloth having a weight per unit area of 30 $g/m^2$ to 1,000 $g/m^2$, the fine-particle silicic acid is held in the porous layer in an amount of from 1 $g/m^2$ to 30 $g/m^2$, and the fine-particle silicic acid is incorporated in an amount ranging from 0.5 part by weight to 2 parts by weight based on 1 part by weight of the binder resin.

The present invention also provides a water-metachromatic toy set which comprises the above water-metachromatic cloth sheet and a water-providing means.

The present invention also provides a writing instrument for water-metachromatic members with which writing instrument any desired writing image is formed by means of water on a water-metachromatic member comprising a support and provided on the surface thereof a porous layer formed of a binder resin to which fine-particle silicic acid stands fixed dispersedly, and capable of rendering different transparency between a liquid-absorbed state and a liquid-unabsorbed state;

the writing instrument comprising a main body, a pen point attached to the front end of the main body, and a water absorber held in the interior of the main body;

the front end of the water absorber being connected to the rear end of the pen point so that the water absorber is internally suppliable with the water by absorption; and the main body being provided at the rear end thereof with a communicating hole through which the rear end of the water absorber communicates with the outside.

DESCRIPTION OF THE PREFERRED EMBODIMENT

Figure 1:
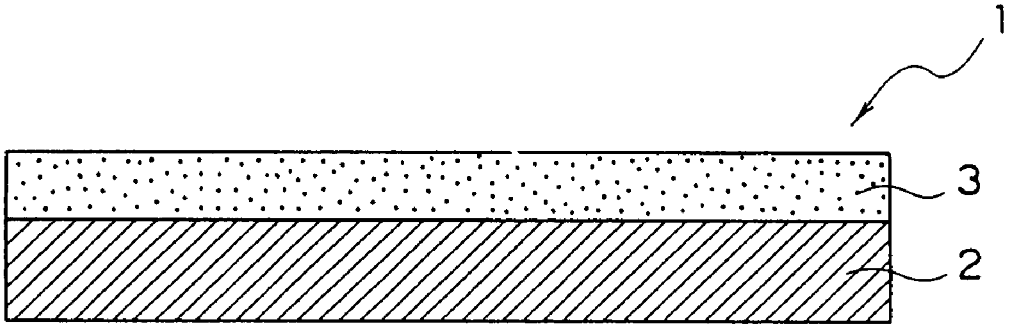
FIG. 1 is an enlarged vertical sectional illustration of an example of the water-metachromatic cloth sheet according to the present invention.

The water-metachromatic cloth sheet of the present invention will be described below in detail with reference to the accompanying drawings (FIGS. 1 to 5).

A water-metachromatic cloth sheet 1 is a water-metachromatic cloth sheet which comprises basically a support or substrate 2 and provided on the surface thereof a porous layer 3 formed of a binder resin to which fine-particle silicic acid stands fixed dispersedly, and is capable of rendering different transparency between a liquid-absorbed state and a liquid-unabsorbed state, and is characterized in that the support 2 is a cloth having a weight per unit area of 30 g/m$^2$ to 1,000 g/m$^2$, the fine-particle silicic acid is held in the porous layer 3 in an amount of from 1 g/m$^2$ to 30 g/m$^2$, and the fine-particle silicic acid is incorporated in an amount ranging from 0.5 part by weight to 2 parts by weight based on 1 part by weight of the binder resin.

Figure 2:
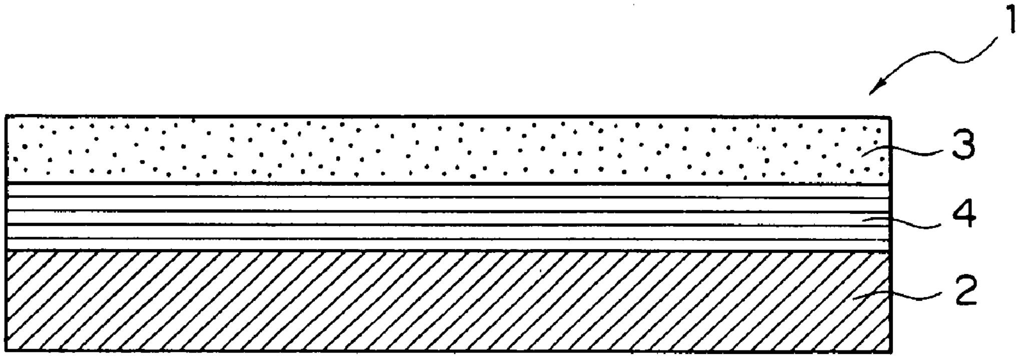
FIG. 2 is an enlarged vertical sectional illustration of another example of the water-metachromatic cloth sheet according to the present invention.
Figure 3:
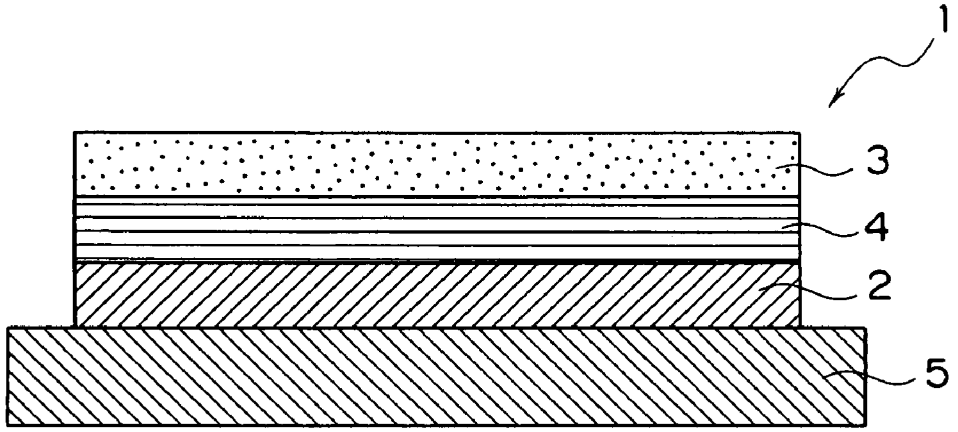
FIG. 3 is an enlarged vertical sectional illustration of still another example of the water-metachromatic cloth sheet according to the present invention.

In a preferred embodiment, the fine-particle silicic acid may be a silicic acid having a particle diameter of from 0.03 $\mu$m to 10 $\mu$m, produced by a wet process and having a two-dimensional structure. The binder resin may be polyurethane resin. A colored layer 4 may further be provided as a lower layer or an upper layer of, or in the vicinity of, the porous layer (FIG. 2). A water-impermeable sheet material 5 may further be provided on the back of the cloth (FIG. 3) The water-impermeable sheet material 5 may be a sheet with a thickness of from 1 $\mu$m to 3 mm, made of a material selected from a soft thermoplastic resin and a thermoplastic elastomer. The cloth may be a quadrilateral having a side of at least 50 cm or longer.

The fine-particle silicic acid may be one produced by a dry process, but the fine-particle silicic acid produced by a wet process (hereinafter "wet-process fine-particle silicic acid") is particularly effective and satisfies practical usability.

This fine-particle silicic acid will be detailed below.

The fine-particle silicic acid is produced as noncrystalline, amorphous (amorphous-powder) silicic acid. According to its production process, it is roughly grouped into a dry-process product obtained by gaseous phase reaction such as thermal decomposition of a silicon halide such as silicon tetrachloride (hereinafter "dry-process fine-particle silicic acid") and a wet-process fine-particle silicic acid obtained by liquid phase reaction such as decomposition of sodium silicate with an acid. In order to obtain the function as an opacifying or hiding porous layer as intended in the present invention, the wet-process fine-particle silicic acid is most preferred. This is because the wet-process fine-particle silicic acid and the dry-process fine-particle silicic acid differ in structure from each other. The dry-process fine-particle silicic acid forms a three-dimensional structure as shown below in which silicic acid molecules stand combined closely;

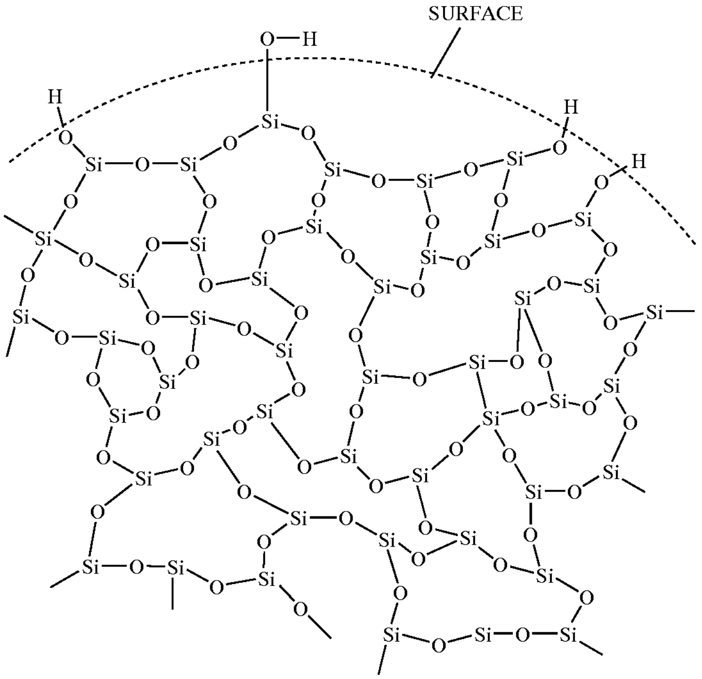

whereas the wet-process fine-particle silicic acid has what is called two-dimensional structure moiety as shown below in which silicic acid is condensed to form a long molecular arrangement.

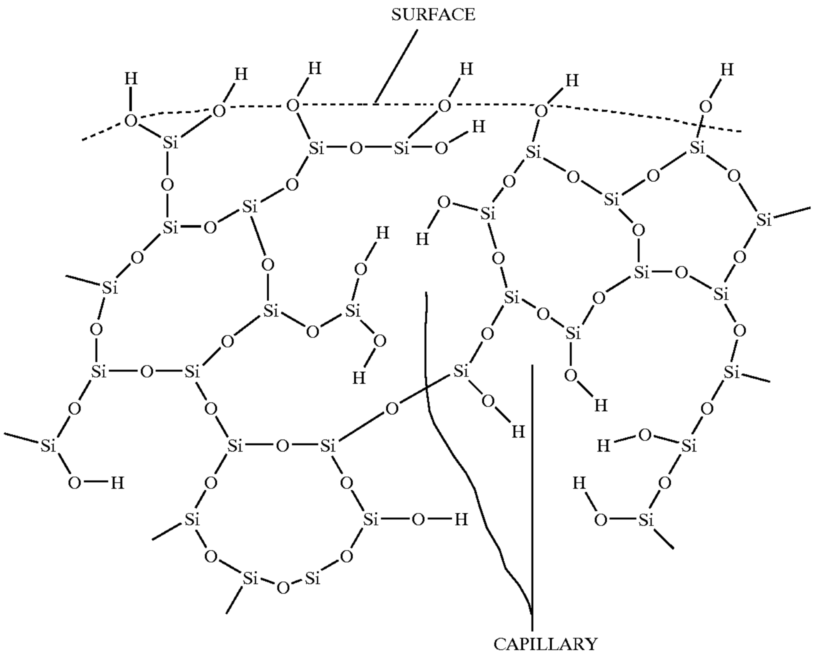

Thus, the wet-process fine-particle silicic acid has a coarser molecular structure than the dry-process fine-particle silicic acid, and hence, when used in the porous layer, the wet-process fine-particle silicic acid can provide superior irregular light reflection properties compared with a system making use of the dry-process fine-particle silicic acid, bringing about a great hiding performance in a normal condition, as so presumed.

Water is absorbed in the above porous layer 3 in the present invention. Accordingly, the wet-process fine-particle silicic acid is preferably used also because it has more hydroxyl groups present on particle surface as silanol groups than the dry-process fine-particle silicic acid, and has a greater degree of hydrophilicity.

Incidentally, in order to adjust the hiding performance in normal condition and the transparency in liquid-absorbed condition of the porous layer, any of other general-purpose pigments having a low refractive index may also be used in combination with the wet-process fine-particle silicic acid.

In order to satisfy both the hiding performance in normal condition and the transparency in liquid-absorbed condition, the wet-process fine-particle silicic acid in the porous layer 3 may preferably be in a coating weight of from 1 $g/m^2$ to 30 $g/m^2$, and more preferably from 5 $g/m^2$ to 20 $g/m^2$, which may depend on its physical properties such as particle diameter, specific surface area and oil absorption. If it is less than 1 $g/m^2$, it is difficult to obtain a sufficient hiding performance in normal condition. If on the other hand it is more than 30 $g/m^2$, it is difficult to obtain a sufficient transparency in liquid-absorbed condition.

There are no particular limitations on the particle diameter of the fine-particle silicic acid. Those having a particle diameter of from 0.03 to 10.0 $\mu$m may preferably be used.

The fine-particle silicic acid is dispersed in a vehicle containing a binder resin as a binding agent, and the dispersion obtained is coated on the support 2, followed by drying to evaporate a volatile component to form the porous layer 3.

The binder resin may include urethane resins, nylon resins, viny acetate resins, acrylate resins, acrylate copolymer resins, acryl polyol resins, vinyl chloride-vinyl acetate copolymer resins, maleic acid resins, polyester resins, styrene resins, styrene copolymer resins, polyethylene resins, polycarbonate resins, epoxy resins, styrene-butadiene copolymer resins, acrylonitrile-butadiene copolymer resins, methyl methacrylate-butadiene copolymer resins, butadiene resins, chloroprene resins, melamine resins, and emulsions of these resins, as well as casein, starch, cellulose derivatives, polyvinyl alcohol, urea resins, and phenolic resins.

The fine-particle silicic acid and any of these binder resins may be mixed in such a proportion that the binder resin is in a solid content of from 0.5 to 2 parts by weight, and more preferably from 0.8 to 1.5 parts by weight, based on 1 part by weight of the fine-particle silicic acid, which depends on the type and properties of the fine-particle silicic acid. If the binder resin solid content is less than 0.5 part by weight based on 1 part by weight of the fine-particle silicic acid, it is difficult to obtain a practical film strength of the porous layer. If it is more than 2 parts by weight, the porous layer may have a poor permeability for water.

The porous layer 3 has a smaller mixing proportion of the binder resin to a colorant than conventionally known commonly available coating films, and hence it is difficult to attain a sufficient film strength. Accordingly, in order to improve anti-scratch strength, it is effective to use, among the above binder resins, nylon resins or urethane resins, or to use either of them in combination with other resin.

The urethane resins include polyester type urethane resins, polycarbonate type urethane resins and polyether type urethane resins. Two or more types of these may be used in combination. Also usable are urethane type emulsion resins prepared by emulsifying and dispersing any of the above resins in water, and colloidal dispersion type (ionomer type) urethane resins dissolved or dispersed in water by self-emulsification without requiring any emulsifier on account of ionic groups of urethane resin itself (urethane ionomer) having ionic properties.

As the above urethane type resins, either of water-soluble urethane resins and oil-soluble urethane resins may be used. Preferably usable in the present invention are water-soluble urethane resins, in particular, urethane type emulsion resins and colloidal dispersion type urethane resins.

The urethane resins may be used alone or in combination. Other binder resins may also be used in combination, in accordance with the type of the support or the performance required in films. In the case when a binder resin other than the urethane resin is used, the urethane resin may preferably be incorporated in the binder resin of the porous layer in an amount of 30% or more as weight ratio of solid content.

In the above binder resins, those which are cross-linkable may be cross-linked by adding any desired cross-linking agent, whereby the film strength can further be improved.

The binder resins differ in extent of their affinity for water. Those having such different affinity may be used in combination. This enables adjustment of the time and degree of permeation of water into the porous layer or the rate of drying after permeation. Such adjustment can be controlled by further adding a dispersant.

In the porous layer 3, a conventionally known metalescent pigment such as titanium-dioxide-coated mica, iron-oxide/titanium-dioxide-coated mica, iron-oxide-coated mica, guanine, sericite, basic lead carbonate, acid lead arsenate or bismuth oxychloride may be added or a common dye or pigment, a fluorescent dye or a fluorescent pigment may be mixed so that changes in color can be made rich in variety.

A conventionally known reversible metachromatic pigment, which is capable of changing in color upon temperature changes, may also be mixed so that color can be changed by environmental temperature or temperature of the water to be provided.

The colored layer 4 may further be provided as mentioned previously, as a lower layer or an upper layer of, and/or in the vicinity of, the porous layer 3 so that the changes in aspects can further be made rich in variety.

The porous layer 3 and the colored layer 4 are by no means limited to solid-printed layers, and may also be images such as characters, symbols and designs.

The porous layer 3 and the colored layer 4 may appropriately be formed by conventionally known means as exemplified by printing means such as screen printing, offset printing, gravure printing, pad printing and transfer, and coating means such as brush coating, spray coating, electrostatic coating, electrodeposition coating, cast coating, roller coating and dip coating.

As the support 2, it is required to use a cloth such as woven fabric, knit or nonwoven fabric. Stated more specifically, it is required to use a cloth having a weight per unit area ranging from 30 $g/m^2$ to 1,000 $g/m^2$, preferably from 30 $g/m^2$ to 500 $g/m^2$. In a system where the weight per unit area is smaller than 30 $g/m^2$, water may be absorbed non-uniformly and insufficiently to make it difficult to form sharp through-view images. On the other hand, in a system where it is larger than 1,000 $g/m^2$, the cloth has so excessively large a section thickness that it may be folded with difficulty when put away or may no longer be light-weight in a system where the sheet itself has a large area, and also that such a cloth is economically disadvantageous.

Of the above cloths, woven fabric may preferably be used as having a good smoothness, in view of an advantage that the porous layer 3 can uniformly be formed.

Use of such a cloth promises a richer water absorption and enables quicker formation of sharper through-view images Q (FIG. 5) more easily than systems where conventional paper is used as a support, and besides may cause no lowering of strength when water is absorbed. In a system where a sheet with a large area is made up, such a cloth can be folded with ease when put away.

Figure 5:
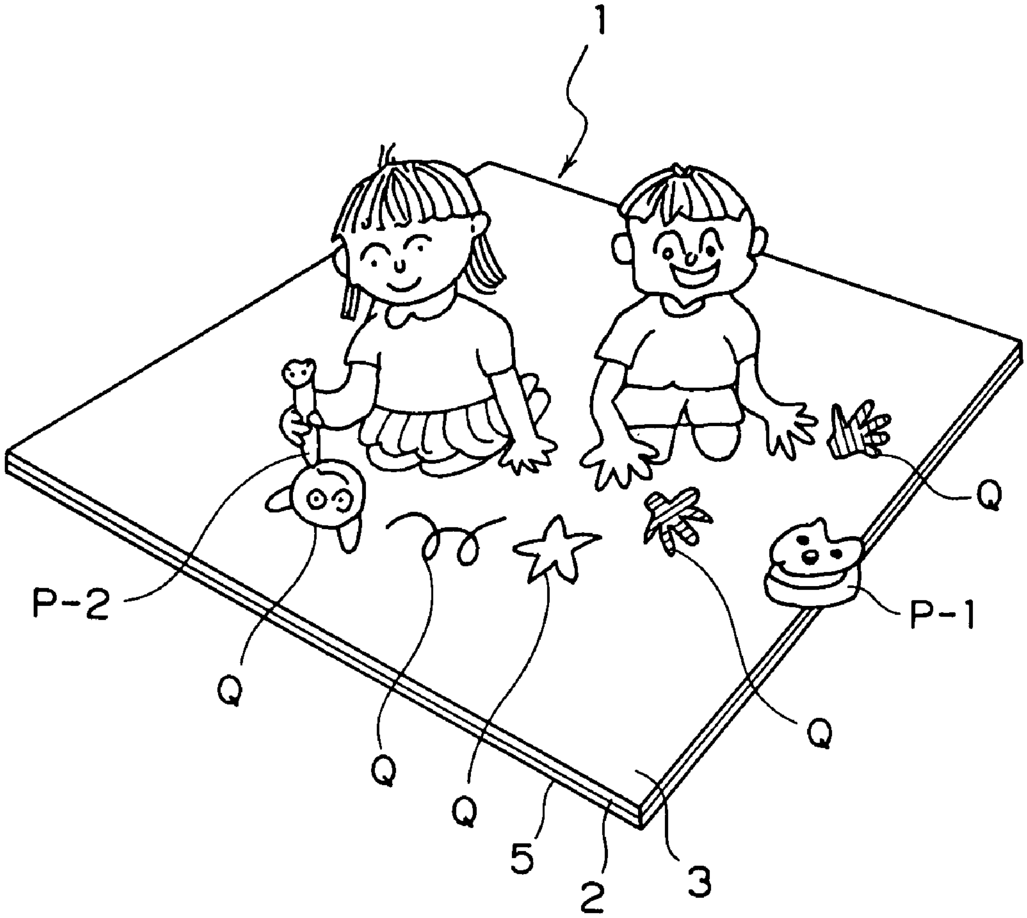
FIG. 5 is an illustration of how the water-metachromatic cloth sheet according to the present invention is used.

On the back of the cloth sheet 1, a water-impermeable sheet material 5 with a thickness of from about 1 μm to about 3 mm may be bonded, sewed, or provided by any other means in close attachment so as to be in the form of a laminate (FIG. 5). Such a sheet material 5 may be comprised of a softened plastic of, e.g., a polyolefin resin or a vinyl chloride resin obtained by blending a plasticizer, or a thermoplastic elastomer of, e.g., a styrene type, urethane type, polyester type, polyamide type, polybutadiene type or fluorine type.

In the foregoing, a water-impermeable sheet material having a thickness smaller than 1 μm may have an insufficient durability. On the other hand, one having a thickness larger than 3 mm may be folded with difficulty.

Where the water-impermeable sheet material 5 is provided on the back of the cloth, any contamination due to leakage of water through the back of the sheet can be prevented when water is dropped on the sheet surface by accident or water is supersaturatedly absorbed, and also it can function as slip-proofing.

Thus, a toy-purpose water-metachromatic cloth sheet 1 can be made up which sheet itself may have an area large enough for infants or someone else to step thereon to play, i.e., may be a quadrilateral having a side of at least 50 cm or longer so that infants or someone else can repeatedly form water images in variety, and which satisfies durability and allows playing without anxiety while avoiding any troubles of contamination due to water.

Second, the present invention is characterized by a water-metachromatic toy set comprising the water-metachromatic cloth sheet 1 described above and a water-providing means P which make a set (see FIG. 5).

As examples of the water-providing means P, it may include a means of a stamp type (P-1) comprising a synthetic resin porous member having open cells or a fibrous worked member, which serve as a water-absorptive element, and having an image such as a design, characters or symbols on the stamp surface, and a means of a writing instrument type (P-2) comprising the above synthetic resin porous member or fibrous worked member, used as a pen point member.

Figure 6:
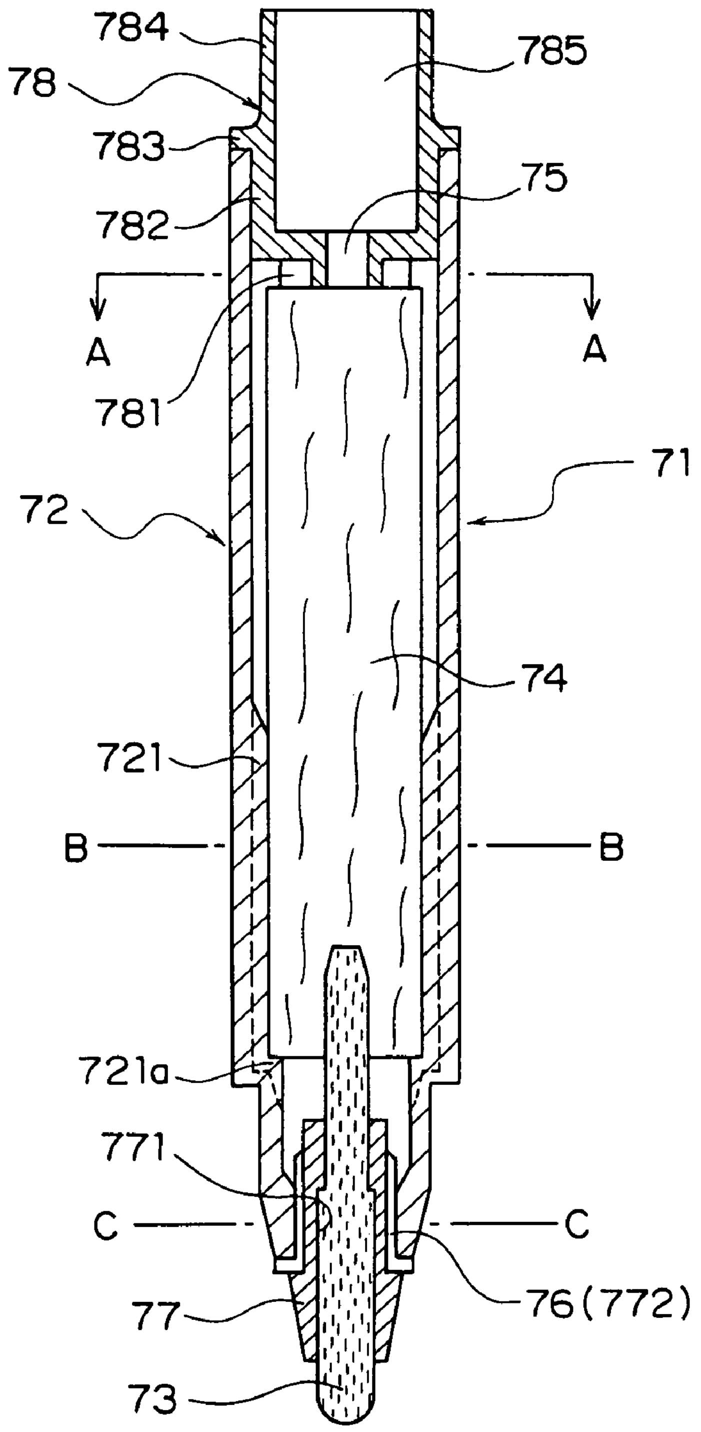
FIG. 6 is a vertical sectional view showing a first example of a writing instrument according to a first embodiment of the present invention.

Of the writing instrument type (P-2), as a first embodiment as shown in FIG. 6, a writing instrument 71 can be exemplified which has the above pen point, 73, as a writing end, fitted to the front end of a main body 72. The rear end of the pen point 73 is connected to the front end of a water absorber 74 comprised of a fiber bunch, held in the main body 72, and the main body 72 is provided at its suitable part thereof with a communicating hole 75 or 76 through which the water absorber 74 communicates with the outside.

In the writing instrument 71, the water with which the water absorber 74 held in the main body 72 is kept impregnated is held within a large number of capillary voids formed between fibers. Water in a proper quantity can be led out to the writing end through the pen point 73, having a capillary force greater than the capillary force of the water absorber 74. The communicating hole 75 or 76 functions to exchange air inside or outside the main body 72 to prevent water from falling in drops so that water in a proper quantity, neither more nor less, can be led out to the writing surface correspondingly to the speed of writing to form a water image. Here, in a system where the communicating hole 75 is provided at the rear end of the main body 72, it can function as a water supply hole (see FIGS. 6 to 11).

In the system formed in the writing instrument 71, the contact between the pen point 73 and the water absorber 74 is normally kept, even in writing in the state where the pen point is kept upward or kept sideway, and water in a proper quantity can be flowed out to the writing surface on account of proper balance of capillary force between the both. Thus, sharp water images can be formed.

As a second embodiment of the writing instrument type (P-2), a writing instrument 81 having structure as shown in FIGS. 16 to 22 can be exemplified. It comprises a holder 83 for holding a pen point 82, and a container 86 capable of holding water directly in the interior. A pour opening 861 from which water is poured into the container 86 is formed at an end of the container 86, and also the holder 83 is so made as to be detachably fitted to the pour opening 861. The holder 83 is fitted to the pour opening 861, thus the interior of the container is hermetically closed.

In the writing instrument 81, the holder 83 has a cylindrical pen point holder 85 which holds the pen point 82 along its outer surface, and the pen point holder 85 is inserted from the pour opening 861 to the interior of the container and disposed therein. Between the outer surface of pen point 82 and the inner surface of the pen point holder 85, a gap 88 may be provided through which the interior of the container 86 communicates with the exterior of the container 86 and with which the water is held by capillary force.

In the system formed in the writing instrument 81, when water 87 is poured into the container 86, the holder is detached from the container 86 at its pour opening 861 to make the pour opening 861 open upward, where the water 87 is poured from the pour opening 861. Thereafter, the holder 83 having the pen point 82 is fitted to the pour opening 861, thus the pour opening 861 is closed up and the interior of the container 86 is hermetically closed. Thus, in the course of pouring the water 87 into the container, there is no possibility that the water 87 leak outside. Also, the holder 83 having the pen point 82 functions also as a cover of the container 86, and hence the number of parts of the whole writing instrument can be smaller, so that a simple structure can be provided.

Here, in the structure where the holder 83 has the cylindrical pen point holder 85 which holds the pen point 82 along its outer surface, and the pen point holder 85 is inserted from the pour opening 861 to the interior of the container and disposed therein, the distance between the part holding the water 87 in the container 86 and the pen point 82 can be set shorter than in the case of a construction where the pen point holder 85 is fitted outside the container 86 (construction different from that of the present invention). Hence, the water 87 can be supplied to the pen point 82 quickly and smoothly and at the same time the whole writing instrument can be set compact. Moreover, in the construction where the gap 88 through which the interior of the container 86 communicates with the exterior of the container 86 and with which the water is held by capillary force is provided between the outer surface of pen point 82 and the inner surface of the pen point holder 85, the gap 88 holds temporarily the water 87 overflowed out of the container 86 when the internal pressure of the container 86 increases as a result of a temperature change or the like. At the same time, since it holds the water 87, it keeps the air from flowing in from the outside and allows the air to flow into the container 86 to an extent corresponding to the volume produced upon decrease in the inner pressure of the container 86 as the water 87 is consumed.

More specifically, the gap 88 brings about no possibility that the water 87 leaks through the pen point 82 even when the internal pressure of the container 86 increases as a result of a temperature change or the like. Also, even when the inner pressure of the container 86 decreases as the water 87 is consumed, the air is always kept flowing in neither more nor less, and hence the water can stably and continuously be coated without oversupply or shortage of supply of the water 87 to the pen point 82. Accordingly, it is no longer necessary to provide a complicated structure for any valve mechanism for controlling the flow-out of the water 87 and the flow-in of the air, so that the whole writing instrument can be made simple in structure and the production cost can be kept low.

The gap 88 may further preferably be so set that its width size S (FIGS. 19 and 20) in the diameter direction becomes smaller as it extends rearwards. This makes the capillary force at the gap 88 gradually greater as the gap extends rearwards. Thus, where the internal pressure of the container 86 has increased, the water 87 overflowed out of the container 86 is temporarily kept held in the the gap from its rear end toward the front. On the other hand, where the internal pressure of the container 86 has decreased, the water 87 held temporarily in the gap 88 is successively smoothly returned to the container 86 without interruption, beginning with the water 87 at the end portion of the gap 88.

Moreover, since the capillary force at the gap 88 is so set as to be stronger at its rear portion than at its front portion, a liquid-sealing zone is formed there with which the water 87 is always held and the flow of the air into the container 86 is controlled.

More specifically, since the width S in the diameter direction of the gap 88 is so set smaller as it extends rearwards, the pressure control mechanism (i.e., the function to control the flow of the air into the container 86 and the function to hold the water 87 temporarily) can effectively be exhibited.

Third, the present invention is related to a writing instrument made general-purpose by further embodying the writing instrument 71 described previously, and is related to a writing instrument for water-metachromatic members with which writing instrument any desired writing image is formed on a water-metachromatic member comprising a support which is not limited to the cloth, and provided on the surface thereof a porous layer formed of a binder resin to which fine-particle silicic acid stands fixed dispersedly, and capable of rendering different transparency between a liquid-absorbed state and a liquid-unabsorbed state. This writing instrument is characterized by comprising a main body 72, a pen point 73 attached to the front end of the main body 72, and a water absorber 74 held in the interior of the main body 72; the front end of the water absorber 74 being connected to the rear end of the pen point 73 so that the water absorber is internally suppliable with water by absorption; and the main body 72 being provided at the rear thereof with a communicating hole 75 through which the rear end of the water absorber 74 communicates with the outside. The water absorber 74 is internally suppliable with water by absorption from the pen point 73.

As specific embodiments, this writing instrument may be further characterized in that the water absorber 74 is so constructed as to be internally suppliable with water by absorption through the communicating hole 75 at the rear of the main body 72; that the communicating hole 75 at the rear of the main body 72 is made open outside at a position rearward to the rear end of the water absorber 74; that a communicating hole 76 through which the front end of the water absorber 74 communicates with the outside is provided at the front portion of the main body 72; that the pen point 73 and the water absorber 74 each comprises a fibrous worked member or a synthetic resin porous member, and the pen point 73 has a capillary force set greater than the capillary force of the water absorber 74; and that a tail stopper 78 is fixed to the rear-end opening of the main body 72, and the communicating hole 75 is provided in the tail stopper 78 (see FIGS. 6 to 22).

(Operation)

Where the water is supplied by absorption through the pen point 73 at the front portion of the main body 72 (see FIG. 9), the pen point 73 is immersed in the water, whereupon the water absorber 74 is supplied with water by absorption by the aid of the capillary force of the pen point 73 and water absorber 74. In that course, the communicating hole 75 at the rear of the main body 72 functions as an air flow-through hole through which the water absorber 74 communicates with the outside air. Hence, as the water absorber 74 is internally supplied with water by absorption, the air present in the water absorber 74 is released from the communicating hole 75 to the exterior of the main body 72. Thus, the air and the water can smoothly be exchanged between the interior of the water absorber 74 held in the main body 72 and the exterior of the main body 72, and the water absorber 74 is smoothly internally supplied with water by absorption while pressure equilibrium is kept between the interior of the water absorber 74 and the outside air.

Thus, the writing instrument is so constructed that the water absorber 74 is internally supplied with water by absorption by utilizing the capillary force of the pen point 73 itself and water absorber 74 itself. Hence, there is no possibility that the water absorber 74 is supplied with water in excess beyond a stated quantity to cause leakage of water to the outside.

Then, where the water absorber 74 is internally supplied with water by absorption through the communicating hole 75 at the rear of the main body 72 (see FIG. 10), the rear portion of the main body 72 is immersed in the water, whereupon water comes into contact with the rear of the water absorber 74 through the communicating hole 75 at the rear of the main body 72, and the water absorber 74 is internally supplied with water by absorption by the aid of the capillary force of the water absorber 74. More specifically, in this case, the communicating hole 75 at the rear of the main body 72 functions as a water flow-through hole. Also, in this case, the pen point 73 functions as an air flow-through hole. Hence, as the water absorber 74 is internally supplied with water by absorption through the communicating hole 75, the air present in the water absorber 74 held in the main body 72 is released from the pen point 73 (i.e., through capillary gaps of the pen point 73) to the exterior of the main body 72. Thus, the air and the water can smoothly be exchanged between the interior of the water absorber 74 held in the main body 72 and the exterior of the main body 72, and the water absorber 74 is smoothly internally supplied with water by absorption while pressure equilibrium is kept between the interior of the water absorber 74 and the outside air.

Incidentally, the whole main body 72 may be immersed in water, and the water absorber 74 may be internally supplied with water by absorption through both the pen point 73 and the communicating hole 75 and at the same time the air is discharged therethrough so that the water absorber 74 can quickly supplied with water by absorption.

Here, the communicating hole 75 at the rear of the main body 72 may be made open outside at any position as long as it is made open at the rear of the main body 72. Preferably, it is effective for the communicating hole 75 at the rear of the main body 72 to be made open outside at a position rearward to the rear end of the water absorber 74.

(Operation)

Thus, in the case when the water absorber 74 is supplied with water by absorption through the rear of the main body 72 (see FIG. 10), the rear portion of the main body 72 is immersed in the water, whereupon the water absorber 74 can quickly be supplied with water at the rear thereof through the communicating hole 75, and the time taken for the supply with water by absorption can be shortened.

It is preferable to further provide at the front portion of the main body 72 a communicating hole 76 through which the front end of the water absorber 74 communicates with the outside.

(Operation)

In the case when the water is supplied through the front of the main body 72 (see FIG. 9), the front portion (i.e., the pen point 73 and communicating hole 75) of the main body 72 is immersed in the water, whereupon the water absorber 74 is supplied with water by absorption and at the same time the water enters the main body 72 also through the communicating hole 76 at the front portion of the main body 72, and the front portion of the water absorber 74 is immediately immersed in water to the extent where the front portion of the main body 72 is immersed. Hence, the front portion of the water absorber 74 can directly be supplied with water, and the time taken for the supply with water by absorption can be shortened. Incidentally, the communicating hole 76 may preferably be made open outside at a position frontward to the front end of the water absorber 74. Thus, the water absorber 74 can more quickly be supplied with water at the front end of the water absorber 74 through the communicating hole 76.

In the case when the water absorber 74 is supplied with water through the rear of the main body 72 (see FIG. 10), the air can not be taken from the outside into the water absorber 74 held in the main body 72, when the pen point 73 stands wet with water. Hence, the water absorber 74 can not smoothly internally be supplied with water through the rear of the main body 72. However, since the communicating hole 76 is provided at the front of the main body 72, the air can flow across the interior of the main body 72 and the exterior of the main body 72 through the communicating hole 76 even when the pen point 73 stands wet with water. Thus, the air and the water can smoothly be exchanged between the interior of the water absorber 74 held in the main body 72 and the exterior of the main body 72, so that the water absorber 74 can smoothly internally be supplied with water through the rear of the main body 72.

Here, it is preferred that the pen point 73 and the water absorber 74 each comprise a fibrous worked member or a synthetic resin porous member and the pen point 73 has a capillary force set greater than the capillary force of the water absorber 74.

(Operation)

Since the pen point 73 has a capillary force set greater than the capillary force of the water absorber 74, the water can smoothly be supplied from the water absorber 74 to the front end of the pen point 73 when the writing instrument is used, and smooth writing on the water-metachromatic member can be made. Also, when the water absorber 74 is supplied with water by absorption from the side of the pen point 73, the water can smoothly be sucked up and supplied to the interior of the water absorber 74 by the aid of the capillary force of the pen point 73. Also, since the pen point 73 and the water absorber 74 each comprises a fibrous worked member or a synthetic resin porous member, the capillary gaps necessary for the pen point 73 and water absorber 74 to have a proper capillary force can be set with ease.

Incidentally, in the stamp type and the writing instrument type, the plastic porous member may be an open-cell material having a void volume of from 30 to 85%, formed of any of plastics of polyolefin type, polyurethane type or other various types which are conventionally used for general purposes. The fibrous worked member may include those obtained by treating fibers with resin or by working fibers by heat fusing, and those having the form of felt or nonwoven fabric.

EXAMPLES

The present invention will be described below in greater detail by giving Examples. In the following, "part(s)" is by weight unless particularly noted.

Example 1

A pink-colored polyester satin cloth with a weight per unit area of 90 g/m$^2$ was used as the support 2. On its whole surface, a white screen printing ink prepared by uniformly mixing and stirring 15 parts of wet-process fine-powder silica (trade name: NIPSIL E-200; available from Nippon Silica Industrial Co., Ltd.), 30 parts of a urethane emulsion (trade name: HYDRAN HW-930; available from Dainippon Ink & Chemicals, Incorporated; solid content: 50%), 50 parts of water, 0.5 part of a silicone type anti-foaming agent, 3 parts of a water-based ink thickening agent, 1 part of ethylene glycol and 3 parts of a blocked isocyanate type cross-linking agent was solid-printed using a 80-mesh screen plate, followed by drying at 130° C. for 5 minutes to harden to form the porous layer 3, thus a rectangular water-metachromatic cloth sheet of 1 m×1.5 m was obtained (see FIG. 1).

In the water-metachromatic cloth sheet 1 the pink color of the support 2 stood hidden in a normal condition, and the sheet was visually perceived as a white porous layer 3 over the whole surface.

The palm of a hand wetted with water was pressed against the water-metachromatic cloth sheet 1, whereupon the porous layer 3 turned transparent at that part, and a pink image Q corresponding to the palm of a hand was visually perceivable.

The pink image returned to the original white when the porous layer 3 became dry, and the image became invisible.

Example 2

A white-colored nylon taffeta cloth with a weight per unit area of 45 g/m$^2$ was used as the support 2. On its whole surface, a green screen printing ink prepared by uniformly mixing and stirring 5 parts of a green pigment (trade name: SANDYE SUPER GREEN LXB; available from Sanyo Color Works, Ltd.), 50 parts of an acrylate emulsion (trade name: MOVINYL 763; available from Hoechst Gosei K.K.; solid content: 48%), 3 parts of a water-based ink thickening agent, 0.5 part of a leveling agent, 0.3 part of an anti-foaming agent and 5 parts of an epoxy type cross-linking agent was solid-printed using a 180-mesh screen plate, followed by drying at 100° C. for 3 minutes to harden to form the colored layer 4.

Next, on the whole surface of the colored layer 4, a yellow screen printing ink prepared by uniformly mixing and stirring 15 parts of wet-process fine-powder silica (trade name:

NIPSIL E-200; available from Nippon Silica Industrial Co., Ltd.), 1 part of a yellow pigment (trade name: SANDYE SUPER YELLOW 10GS; available from Sanyo Color Works, Ltd.), 45 parts of a urethane emulsion (trade name: HYDRAN AP-20; available from Dainippon Ink & Chemicals, Incorporated; solid content: 30%), 40 parts of water, 0.5 part of a silicone type anti-foaming agent, 3 parts of a water-based ink thickening agent, 1 part of ethylene glycol and 3 parts of a blocked isocyanate type cross-linking agent was solid-printed using a 100-mesh screen plate, followed by drying at 130° C. for 5 minutes to harden to form the porous layer 3, thus a rectangular water-metachromatic cloth sheet 1 of 1 m×1.5 m was obtained (see FIG. 5).

In the water-metachromatic cloth sheet 1, the yellow porous layer 3 was visually perceived in a normal condition. Characters were written on that sheet, whereupon the porous layer 3 turned transparent at that part, and green characters were visually perceivable.

The green characters became invisible when the porous layer 3 became dry, and the sheet returned to the original yellow phase.

Example 3

A white cotton satin cloth with a weight per unit area of 130 g/m$^2$ to the back of which a urethane elastomer sheet of 3 $\mu$m thick had been bonded was used as the support 2. On its surface, a fluorescent pink ink prepared by uniformly mixing and stirring 5 parts of a fine-powder fluorescent pink pigment (trade name: EPOCOLOR FP-112; available from Nippon Syokubai Co., Ltd.), 50 parts of an acrylate emulsion (trade name: MOVINYL 763; available from Hoechst Gosei K.K.; solid content: 48%), 3 parts of a water-based ink thickening agent, 0.5 part of a leveling agent, 0.3 part of an anti-foaming agent and 5 parts of an epoxy type cross-linking agent was solid-printed using a 180-mesh screen plate, followed by drying at 100° C. for 3 minutes to harden to form the colored layer 4. Thereafter, on this colored layer 4, a white screen printing ink prepared by uniformly mixing and stirring 15 parts of wet-process fine-powder silica (trade name: NIPSIL E-200; available from Nippon Silica Industrial Co., Ltd.), 30 parts of a urethane emulsion (trade name: HYDRAN HW-930; available from Dainippon Ink & Chemicals, Incorporated; solid content: 50%), 50 parts of water, 0.5 part of a silicone type anti-foaming agent, 3 parts of a water-based ink thickening agent, 1 part of ethylene glycol and 3 parts of a blocked isocyanate type cross-linking agent was solid-printed using a 80-mesh screen plate, followed by drying at 130° C. for 5 minutes to solidify to form the porous layer 3 in white, thus a water-metachromatic cloth sheet 1 was obtained (see FIG. 3).

Incidentally, in the vicinity of the porous layer 3 of the sheet, indications by common printing ink, such as characters, messages and designs, can be provided so as to impart commercial utility and design decoration.

The above water-metachromatic cloth sheet 1 stands white on the whole in a normal condition. Any desired pink through-view images can be formed to visually perceive, by means of a marker (pen) fitted with a fibrous worked pen member, or by applying the water-providing means P such as a sponge cut in a toy elephant.

Example 4

Figure 4:
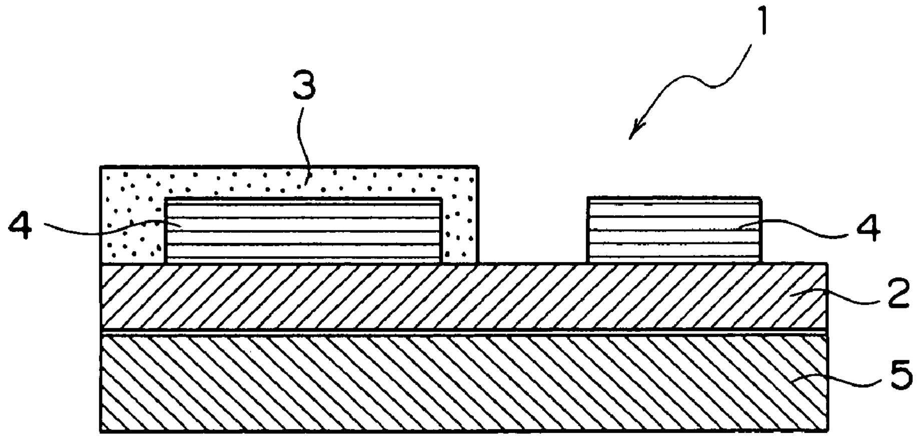
FIG. 4 is an enlarged vertical sectional illustration of a further example of the water-metachromatic cloth sheet according to the present invention.

Using a support 2 prepared by providing a urethane sheet of 3 $\mu$m thick on the back of the white cotton satin cloth as used in Example 3, a colored layer 4 was formed by coating the fluorescent pink ink as used in Example 3 and also another colored layer 4 was provided in a pattern using a common printing ink to obtain a water-metachromatic cloth sheet 1 (see FIG. 4).

The sheet 1 prevented any contamination due to exudation or leakage of water through the back of the sheet even when water was dropped on the sheet surface by accident or the cloth became supersaturated with water.

Examples of the writing instrument are given below.

Example 5

A first example of the writing instrument 71 is given below (see FIGS. 6 to 11).

The writing instrument 71 consists of a main body 72, a pen point 73 fixed to the front end of the main body 72, a water absorber 74 connected at its front end with the rear end of the pen point 73 and held in the interior of the main body 72, and a tail stopper 78 coming into contact with the rear end of the water absorber 74 and fixed to the rear end of the main body 72.

The main body 72 is a cylindrical body obtained by injection molding of a synthetic resin (e.g., polypropylene). To an opening at the front end of the main body 72, the pen point 73 is press-fitted and fixed via a pen point holding member 77. To an opening at the rear end of the main body 72, the tail stopper 78 is press-fitted and fixed. Also, the water absorber 74 is held in the interior of the main body 72.

As the pen point 73, employed is a resin worked member of synthetic resin fibers (e.g., a rod-like resin worked member of acrylic fibers the frond end of which has been cut into a spire or a dome). Also, as the water absorber 74, employed is a fiber bunch worked member (e.g., a synthetic resin fiber bunch such as a polyester fiber bunch the periphery of which has been covered with a synthetic resin film).

The pen point 73 and the water absorber 74 may also each be a single member of a fibrous worked material or synthetic resin porous material, or a combination of a plurality of members of a fibrous worked material or synthetic resin porous material.

The interior of the main body 72 is integrally provided at its front portion with a plurality of lengthwise ribs 721 (specifically, four ribs) extending in the axial direction. The lengthwise ribs 721 brings the water absorber 74 held in the interior of the main body 72, into pressure hold inward in the diameter direction at its front-portion periphery. Also, at the part frontward to the part of the lengthwise ribs 721 at which the water absorber 74 is brought into pressure hold in the diameter direction, a terrace **721*a* is formed so that the front end of the water absorber 74 is contact-supported at the terrace 721*a*** in the axial direction.

The tail stopper 78 is a cylindrical body obtained by injection molding of a synthetic resin (e.g., polyethylene). The tail stopper 78 comprises a contact part 781 coming into contact with the rear end of the water absorber 74 in the axial direction, a press-fit fixing part 782 provided adjoiningly to the contact part 781 and also press-fitted and fixed to the inner surface of the rear-end opening of the main body 72, a collar 783 provided rearward adjoiningly to the press-fit fixing part 782 and also coming into contact with the rear end of the main body 72 in the axial direction, and a cylinder 784 provided rearward adjoiningly to the collar 783 and also projected from the rear end of the main body 72.

Figure 7A:
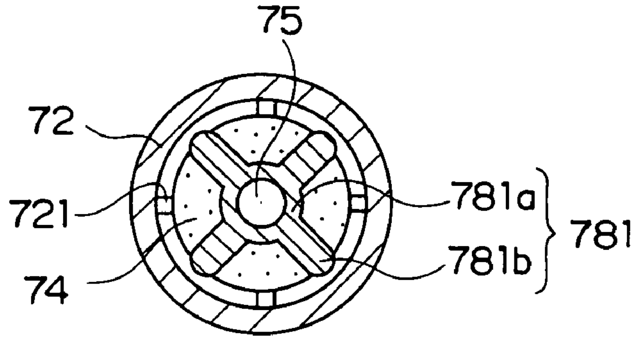
FIG. 7A is a cross-sectional view along the line A—A in FIG. 6.
Figure 7B:
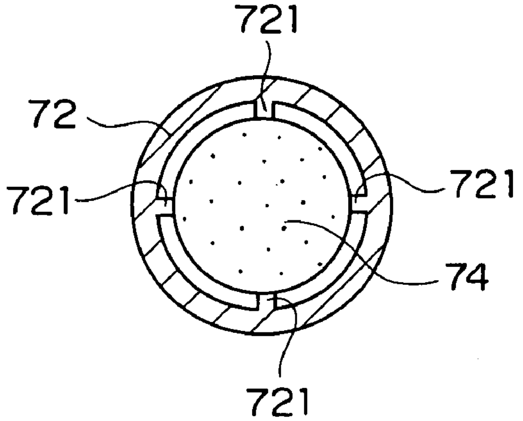
FIG. 7B is a cross-sectional view along the line B—B in FIG. 6.
Figure 7C:
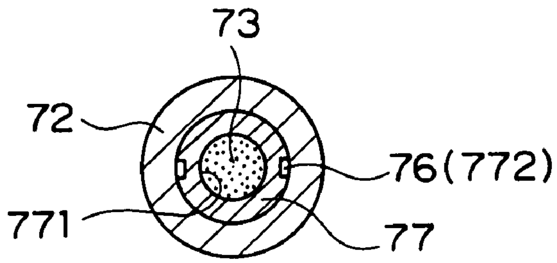
FIG. 7C is a cross-sectional view along the line C—C in FIG. 6.
Figure 8:
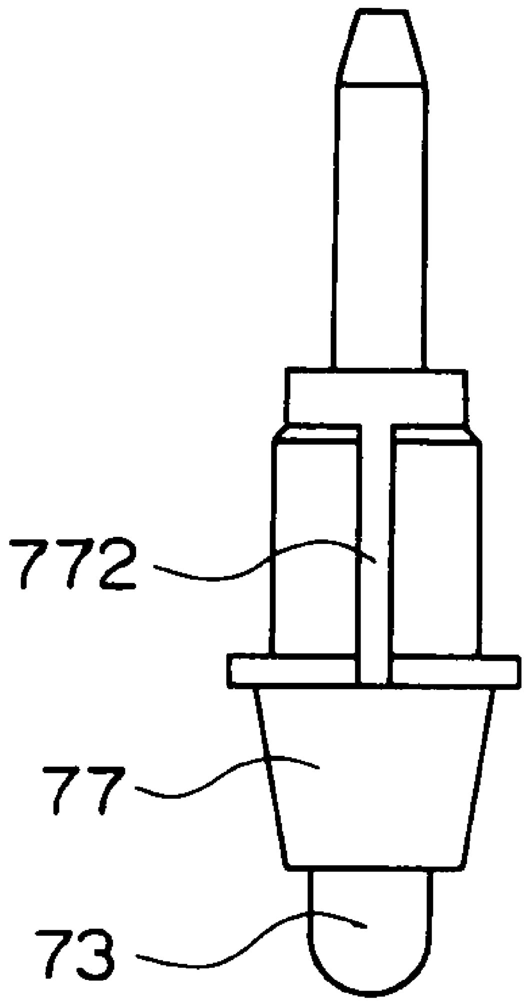
FIG. 8 is a front view of a pen point unit (i.e., an assemblage of a pen point and a pen-point holding member) of the writing instrument shown in FIG. 6.

The contact part 781 consists of a cylindrical axis projection **781*a* and a radial projection 781*b* provided adjoiningly to the cylindrical axis projection 781*a* (FIG. 7A). The axis projection 781*a* and radial projection 781*b* bring the rear end of the water absorber 74 into contact support in the axial direction. Also, a communicating hole 75 (inner diameter: 2 mm to 5 mm) through which the water absorber 74 communicate with the outside air is provided through the axis projection 781***a* in the axial direction.

Since the communicating hole 75 is provided through the tail stopper 78, if an infant detached the tail stopper 78 from the rear-end opening of the main body 72 and had swollowed down the tail stopper 78 by accident, the communicating hole 75 can act to form an air flow path in the interior of a throat to avoid any suffocation trouble. Also, since the communicating hole 75 is positioned on the axis of the main body 72 (i.e., the axis of the water absorber 74), the rear portion of the water absorber 74 can be made to absorb water uniformly when the water absorber 74 is supplied with water by absorption from its rear.

In the interior of the tail stopper 78, a recess 785 which communicates with the communicating hole 75 and also opens rearward is formed. Thus, when water is supplied from the rear of the main body 72, the rear portion of the main body 72 is immersed in the water, whereupon the water is quickly guided to the communicating hole 75 through the recess 785. Hence, the time taken for the water absorber 74 to be supplied with water by absorption can be shortened.

The pen point holding member 77 is a cylindrical member obtained by injection molding of a synthetic resin (e.g., polyacetal). A pen point attachment hole 771 is provided through the interior of the pen point holding member 77, and the pen point 73 is press-fitted to the pen point attachment hole 771 and held therein. Also, the pen point holding member 77 is so press-fitted to the front-end opening of the main body 72 that the former's outer surface is fixed to the latter's inner surface. On the outer surface of the pen point holding member 77, two lengthwise grooves 772 extending in the axial direction are also provided in a position opposite to each other, by which communicating holes 76 can be formed between the inner surface of the front-end opening of the main body 72 and the outer surface of the pen point holding member 77 after the pen point holding member 77 has been press-fitted to the inner surface of the front-end opening of the main body 72.

Figure 9:
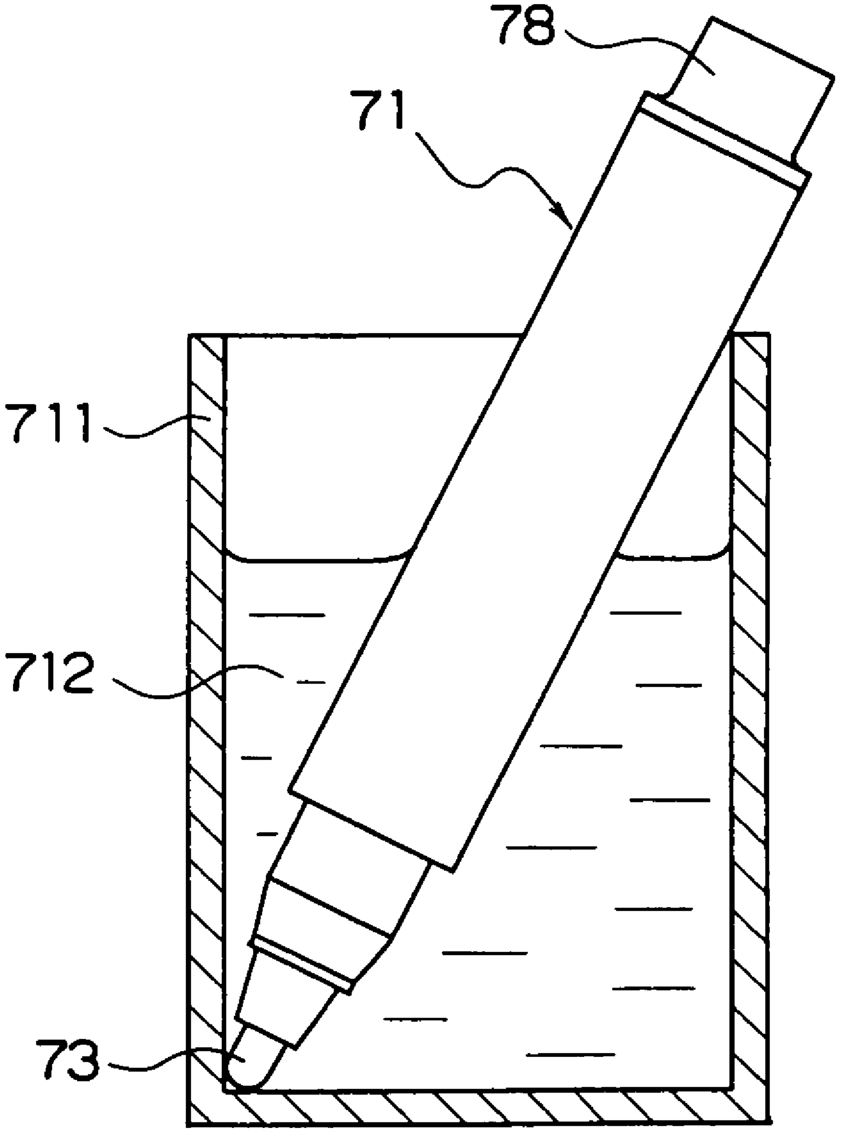
FIG. 9 illustrates supply with water by absorption through the front of the main body of the writing instrument shown in FIG. 6.

FIG. 9 shows an example of the supply of water from the front of the main body 72 in the present Example. Water 712 is held in a container 711 formed of a bottomed casing having an inner diameter larger than the outer diameter of the main body 72. The front portion of the main body 72 having the pen point 73 is (i.e., the pen point 73 and communicating holes 76 are) immersed in the water 712 and at the same time the rear portion (i.e., the communicating hole 75) of the main body 72 is exposed to the outside. In that case, the water enters the interior of the main body 72 from the pen point 73 and the communicating holes 76 at the front portion of the main body 72, and the air present in the main body 72 (i.e. in the water absorber 74) is released outside from the communicating hole 75 at the rear portion of the main body 72. Thus, the front portion of the water absorber 74 is immediately immersed in water to the extent of depth where the front portion of the main body 72 is immersed. Hence, the water absorber 74 is internally supplied with water by absorption in a short time and in a quantity enough for writing.

Figure 10:
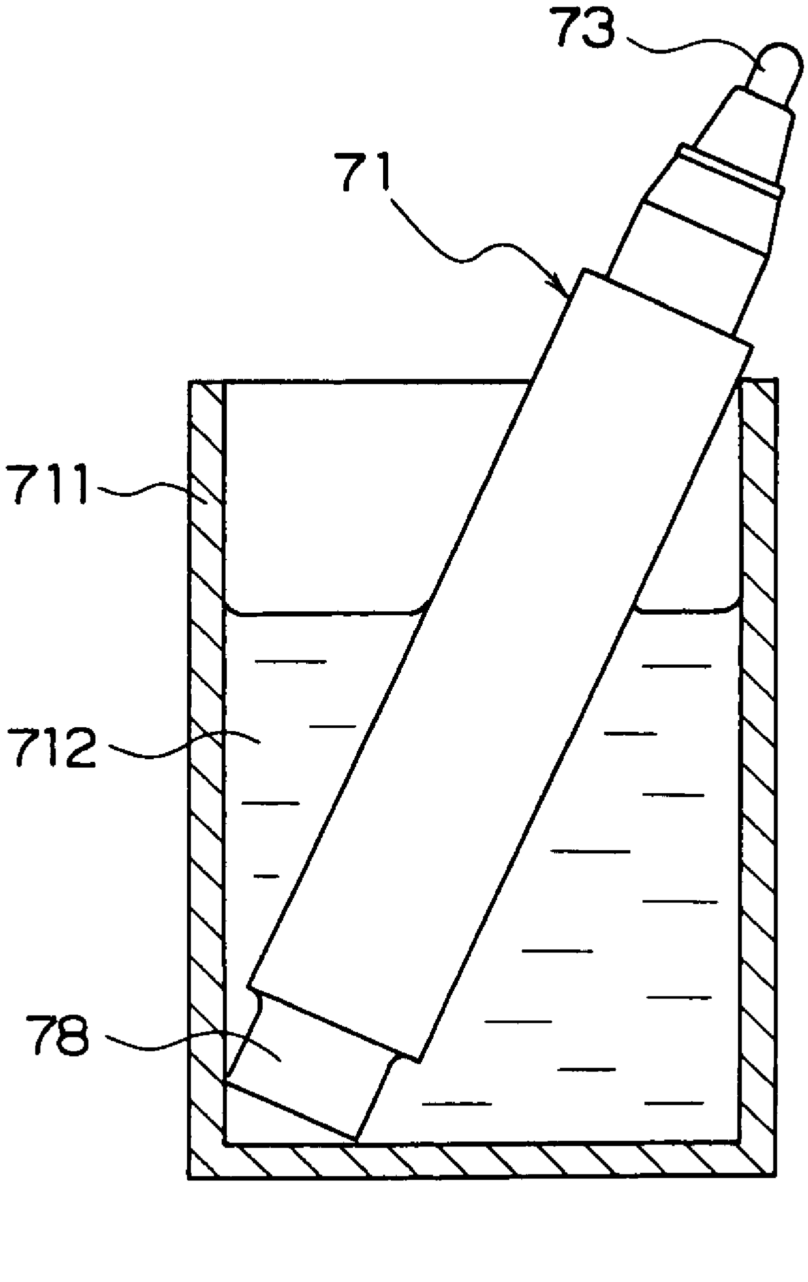
FIG. 10 illustrates supply with water by absorption through the rear of the main body of the writing instrument shown in FIG. 6.

FIG. 10 shows an example of the supply of water from the rear of the main body 72 in the present Example. Water 712 is held in the same container 711 as that shown in FIG. 4. The rear portion of the main body 72 (i.e., the communicating hole 75) is immersed in the water 712 and at the same time the front portion of the main body 72 is (i.e., the pen point 73 and communicating holes 76 are) exposed to the outside. In that case, the water enters the interior of the main body 72 from the communicating hole 75 provided in the tail stopper 78, and the air present in the main body 72 (i.e., in the water absorber 74) is released outside from the pen point 73 (i.e., capillary gaps of the pen point 73) at the front of the main body 72 and from the communicating holes 76. Thus, the rear portion of the water absorber 74 is immediately immersed in water to the extent of depth where the rear portion of the main body 72 is immersed. Hence, the water absorber 74 is internally supplied with water by absorption in a short time and in a quantity enough for writing.

Figure 11:
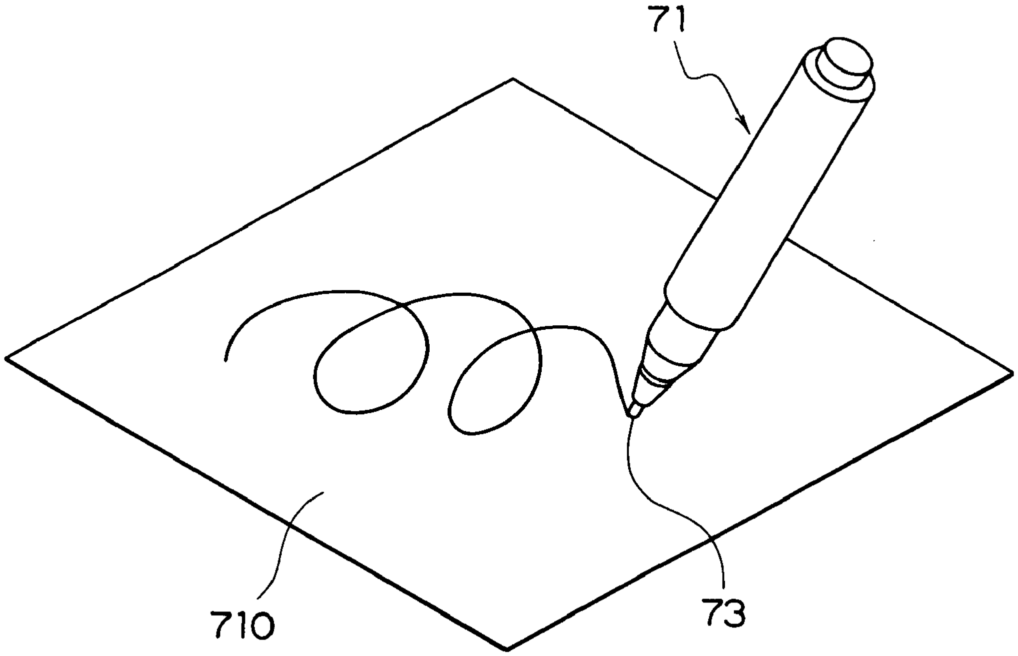
FIG. 11 is a perspective view showing the state of writing with the writing instrument shown in FIG. 6.
Figure 12:
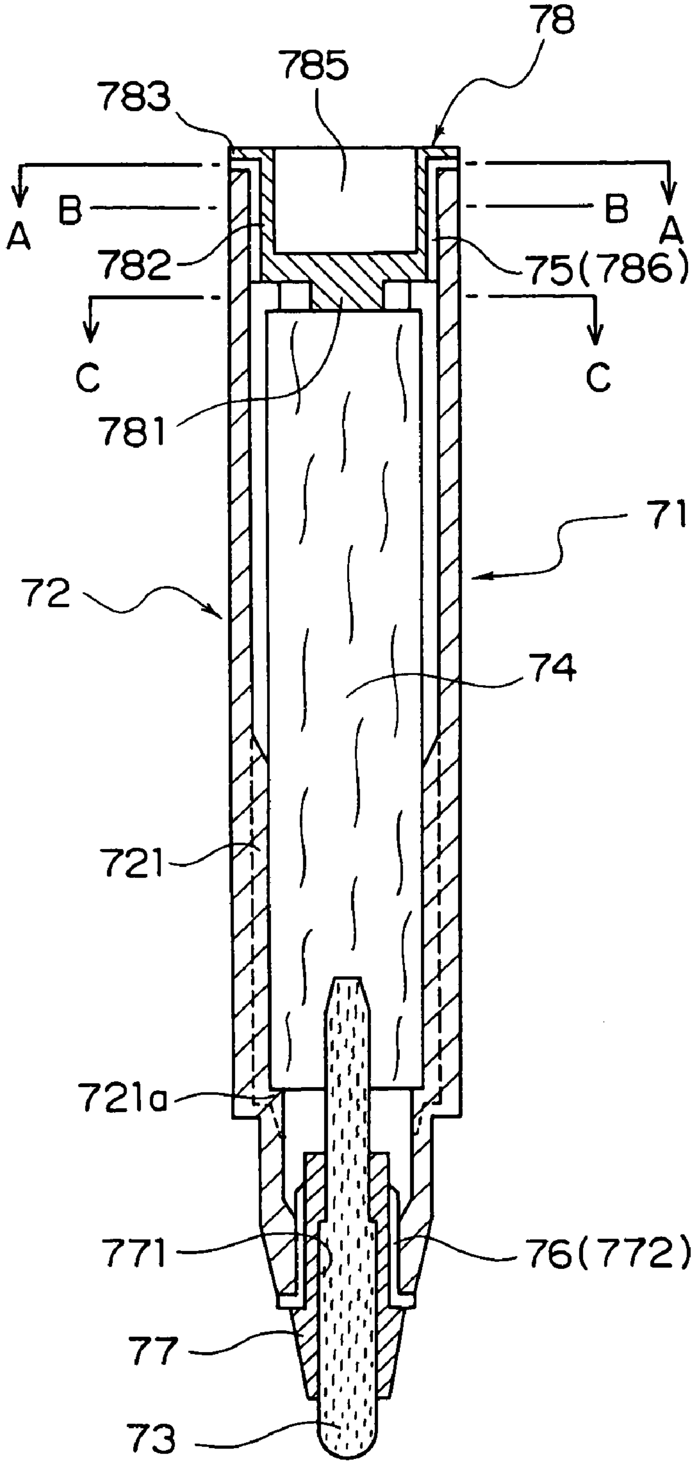
FIG. 12 is a vertical sectional view showing a second example of a writing instrument according to the first embodiment of the present invention.
Figure 13A:
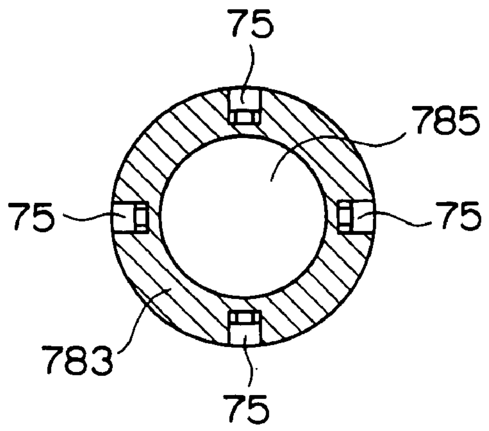
FIG. 13A is a cross-sectional view along the line A—A in FIG. 12.
Figure 13B:
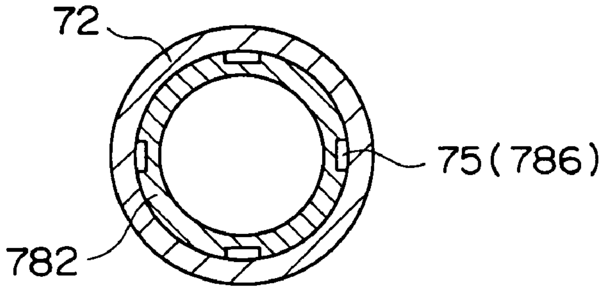
FIG. 13B is a cross-sectional view along the line B—B in FIG. 12.
Figure 13C:
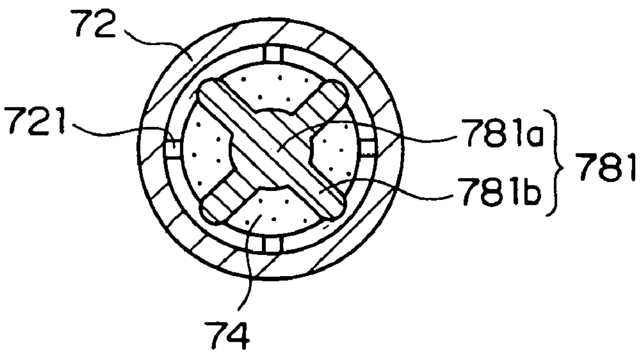
FIG. 13C is a cross-sectional view along the line C—C in FIG. 12.
Figure 14:
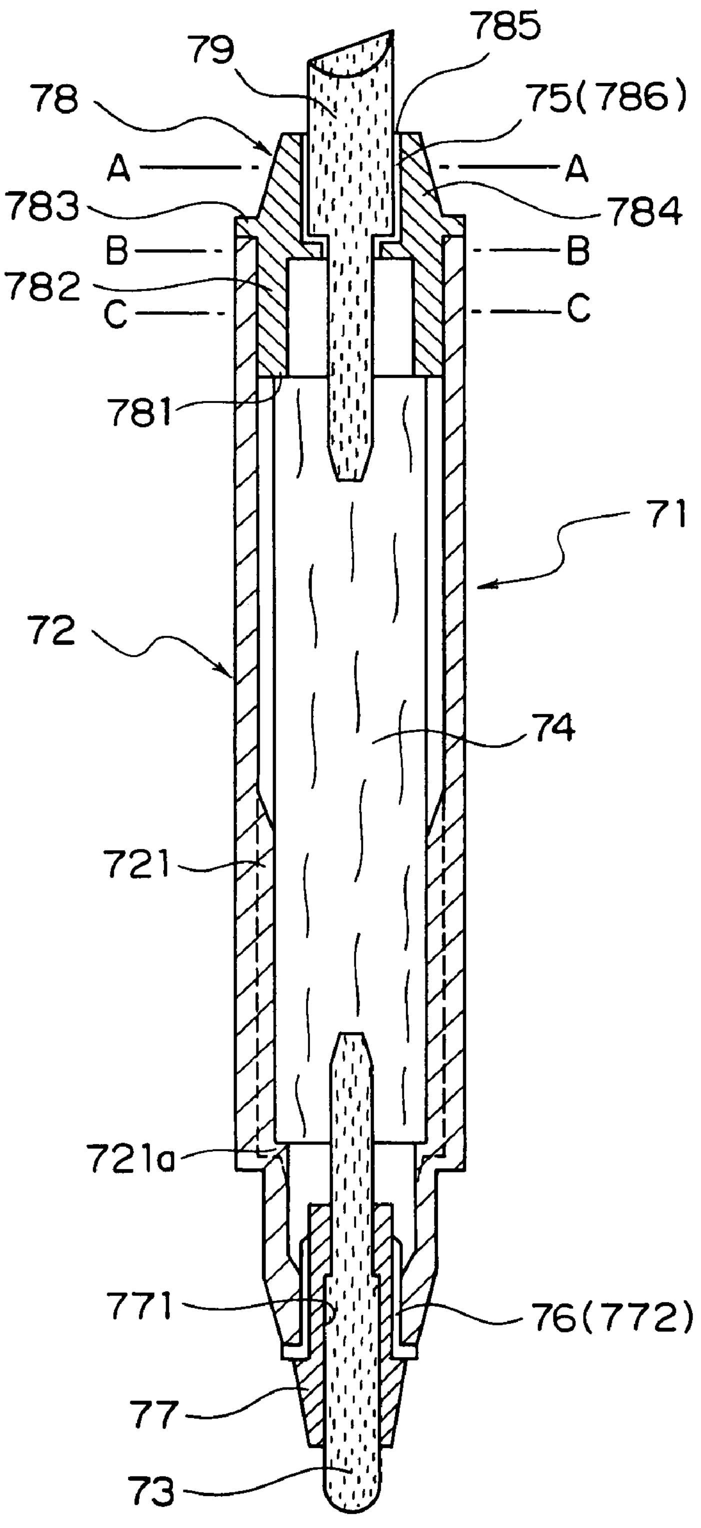
FIG. 14 is a vertical sectional view showing a third example of a writing instrument according to the first embodiment of the present invention.
Figure 15A:
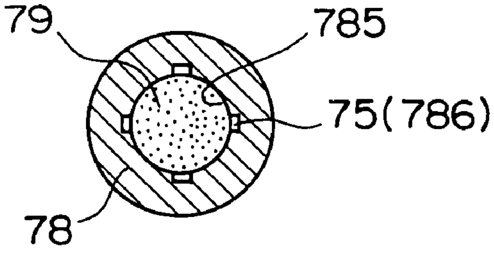
FIG. 15A is a cross-sectional view along the line A—A in FIG. 14.
Figure 15B:
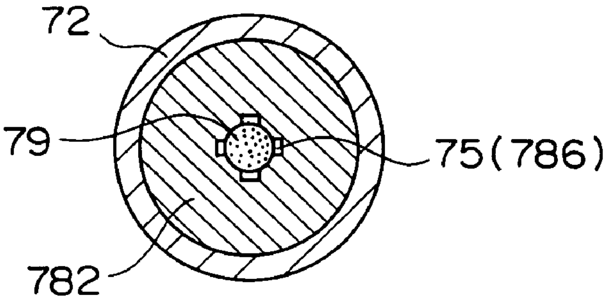
FIG. 15B is a cross-sectional view along the line B—B in FIG. 14.
Figure 15C:
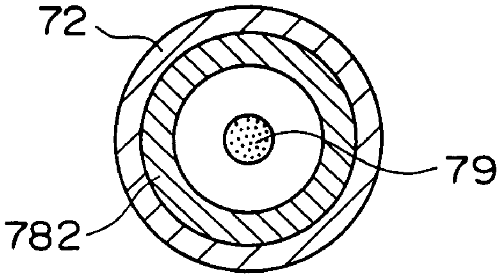
FIG. 15C is a cross-sectional view along the line C—C in FIG. 14.
Figure 16:
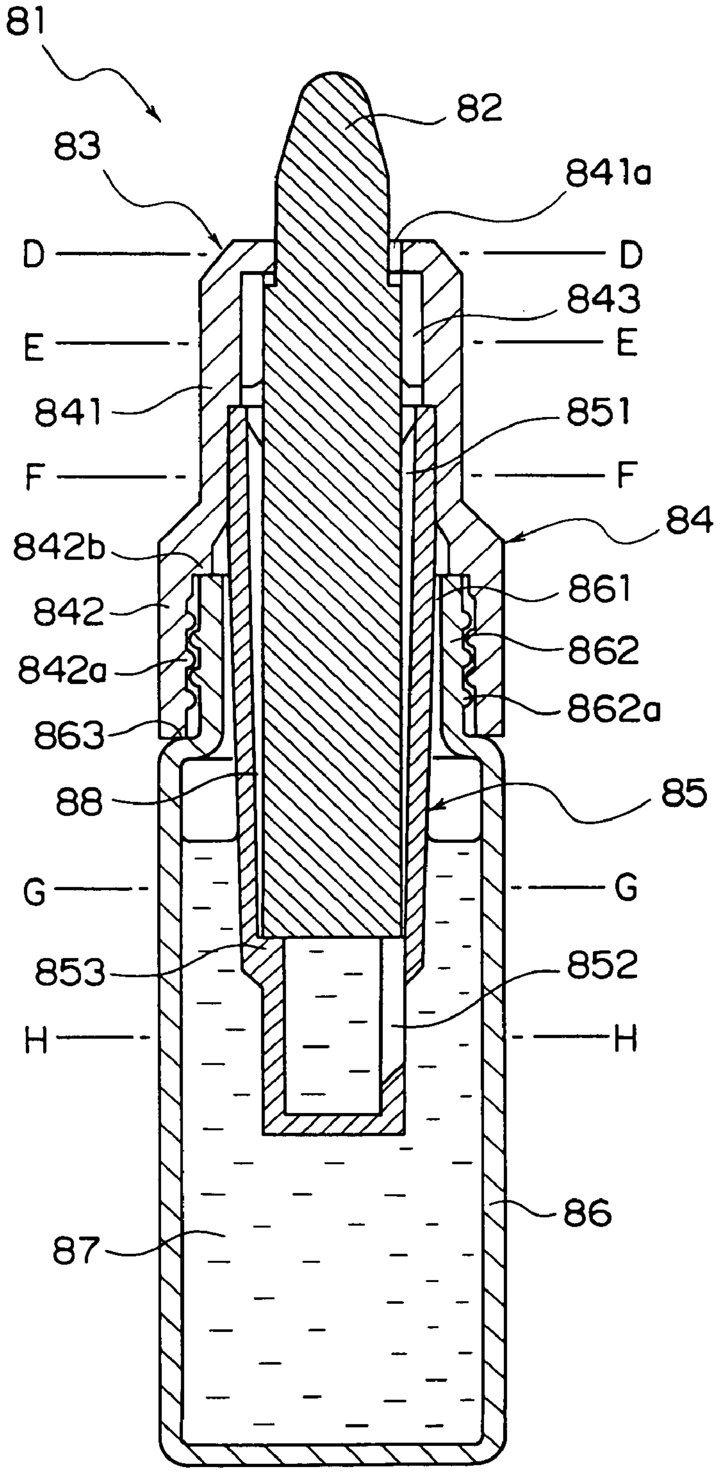
FIG. 16 is a vertical sectional view showing a first example of a writing instrument according to a second embodiment of the present invention.
Figure 17:
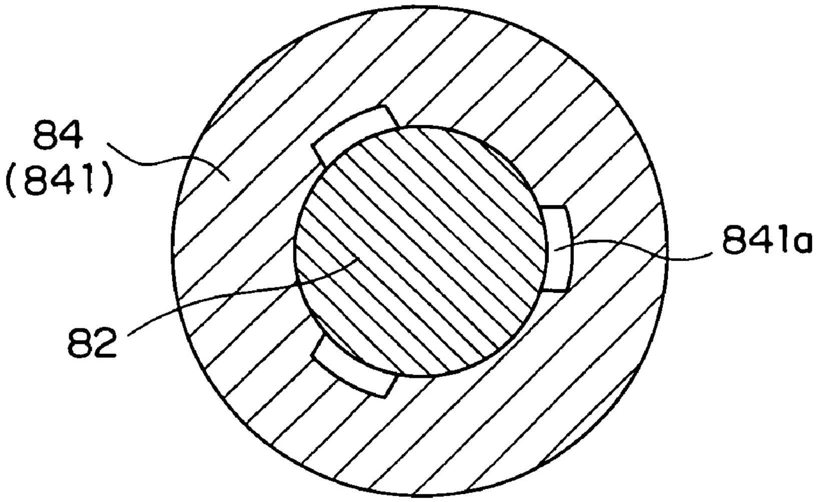
FIG. 17 is an enlarged cross-sectional view along the line D—D in FIG. 16.
Figure 18:
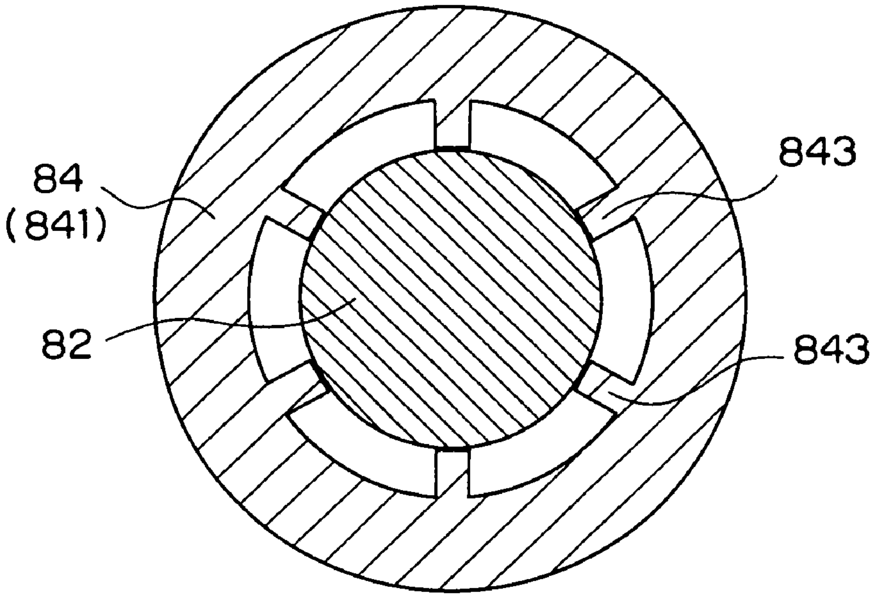
FIG. 18 is an enlarged cross-sectional view along the line E—E in FIG. 16.

FIG. 11 illustrates a state where the writing instrument for water-metachromatic members of the present Example is used in writing. With the writing instrument 71 for water-metachromatic members which has been supplied with water in its main body 72, images can be written on the surface of a water-metachromatic member 10 (e.g., a water-metachromatic cloth sheet). During the use in writing, the communicating hole 75 and communicating holes 76 function as air flow-through holes to prevent the internal pressure of the main body 72 from lowering as the water is consumed with writing, and ensure smooth flow-out of water from the pen point 73.

Example 6

A second example of the writing instrument 71 is given here (see FIG. 12 and FIGS. 13A to 13C).

This example is a modification of the tail stopper 78 in the first example. What differs from the first example is that, without providing any communicating hole 75 as in the first example at the axis of the tail stopper 78, lengthwise grooves 786 are provided at the outer surface of the press-fit fixing part 782 and the front surface of the collar 783 to form communicating holes 75 between the inner surface of the rear-end opening of the main body 72 and the outer surface of the tail stopper 78, and that any cylinder 784 as in the first example is not provided at the rear of the collar 783 of the tail stopper 78. Other construction is the same as the first example, and its description is omitted.

Example 7

A third example of the writing instrument 71 is given here (see FIG. 14 and FIGS. 15A to 15C).

This example is a modification of the tail stopper 78 in the first example. What differs from the first example is that the pen point 73 is provided at the front end and also another pen point 79 is press-fit held in the tail stopper 78 (i.e., a double-end type writing instrument is made up which has pen points having different size or shape, stated specifically, the pen point 73 and the pen point 79, at both ends of the main body 72), and that lengthwise grooves 786 are provided at the inner surface of the recess 785 (i.e., a pen point attachment hole) to form communicating holes 75 between the inner surface of the recess 785 of the tail stopper 78 and the outer surface of the pen point 79.

The pen point 79 provided in the tail stopper 78 is a fibrous resin worked member as in the first example, and its front end is cut in a chisel edge. Other construction is the same as the first example, and its description is omitted.

Example 8

An example of the writing instrument 81 is given here (see FIGS. 16 to 22).

The writing instrument 81 consists basically of a pen point 82, a holder 83 to which the pen point 82 has been fixed, and a container 86 to which the holder 83 is detachably fitted.

The pen point 82 is a rod-like resin worked member of a fiber bunch (e.g., a resin worked member of polyester fibers or polyamide fibers). It has a tip tapering to the end and also a shoulder is formed between the tip and its rearward-lying outer surface of the pen point 82.

The container 86 is a bottomed casing at the front end of which a pour opening 861 is opened and the rear end of which is closed. It can be obtained by blow molding of a synthetic resin (e.g., polyethylene terephthalate resin). At the front end of the container 86, a constriction 862 is formed and also a shoulder 863 is formed at the boarder of the constriction 862 and its rearward-lying outer surface of the container 86. An external thread 862*a* is also provided at the outer surface of the constriction 862 of the container 86. Water 87 is directly held in the container 86.

The holder 83 is a double-wall cylindrical body consisting of an outer cylinder 84 having a frontward small-diameter portion 841 and a rearward large-diameter portion 842 and an inner cylinder 85 the outer surface at the front end portion of which is fixed by press-fitting or bonding to the inner surface of the outer cylinder 84 (i.e., the inner surface of the small-diameter portion 841). Both the outer cylinder 84 and the inner cylinder 85 can be obtained by injection molding of a synthetic resin (e.g., ABS resin). At the inner surface of the large-diameter portion 842 of the outer cylinder 84, an internal thread 842*a* is provided which is engageable with the external thread 862*a* provided at the outer surface of the front end portion of the container 86, and also a circular terrace 842*b* is formed at the front part of the internal thread 842*a* formed at the inner surface of the large-diameter portion 842 of the outer cylinder 84. The inner cylinder 85 is a bottomed cylinder having a bottom at its rear end, and the rear portion is projected rearward from the rear end of the outer cylinder 84.

The holder 83 is fitted to the pour opening 861 of the container 86, where the inner surface (the internal thread 842*a*) of the outer cylinder 84 is engaged with the outer surface of the constriction 862 (the external thread 862*a*) of the container 86, and also the rear end of the outer cylinder 84 is brought into contact with the shoulder 863 of the container 86. At the same time, the inner cylinder 85 is loosely inserted to the interior of the container 86 from the pour opening 861, and also the circular terrace 842*b* at the inner surface of the outer cylinder 84 and the opening end of the pour opening 861 are brought into close contact with each other. Thus, the water 87 is prevented from leaking outside. Also, when the water 87 is supplied (poured) into the container 86 or when the water 87 is discharged out of the container 86, the holder 83 is detached from the container 86. Thus, the state of close contact between the circular terrace 842*b* of the outer cylinder 84 and the opening end of the pour opening 861 is released.

Figure 19:
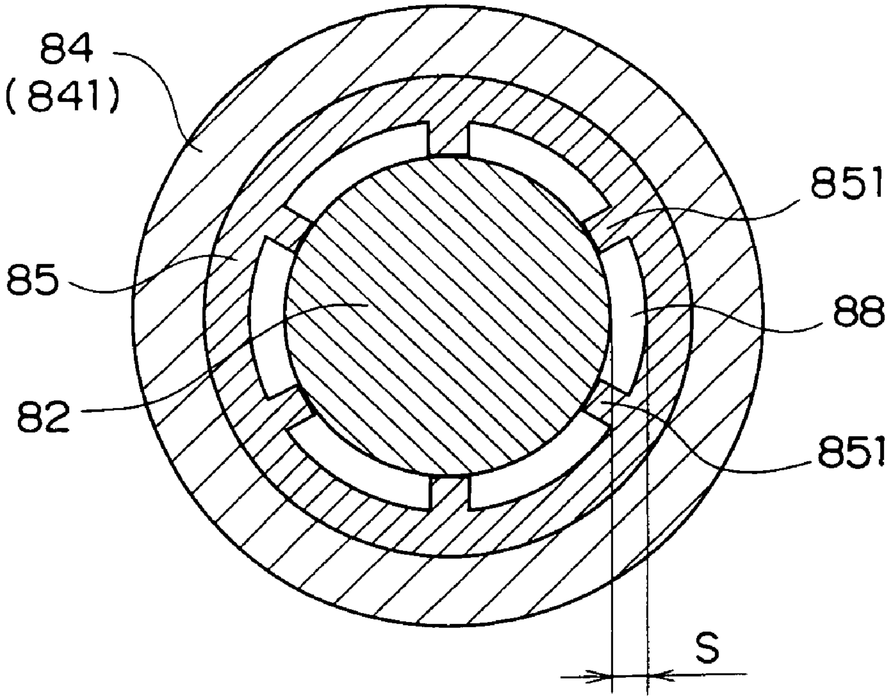
FIG. 19 is an enlarged cross-sectional view along the line F—F in FIG. 16.
Figure 20:
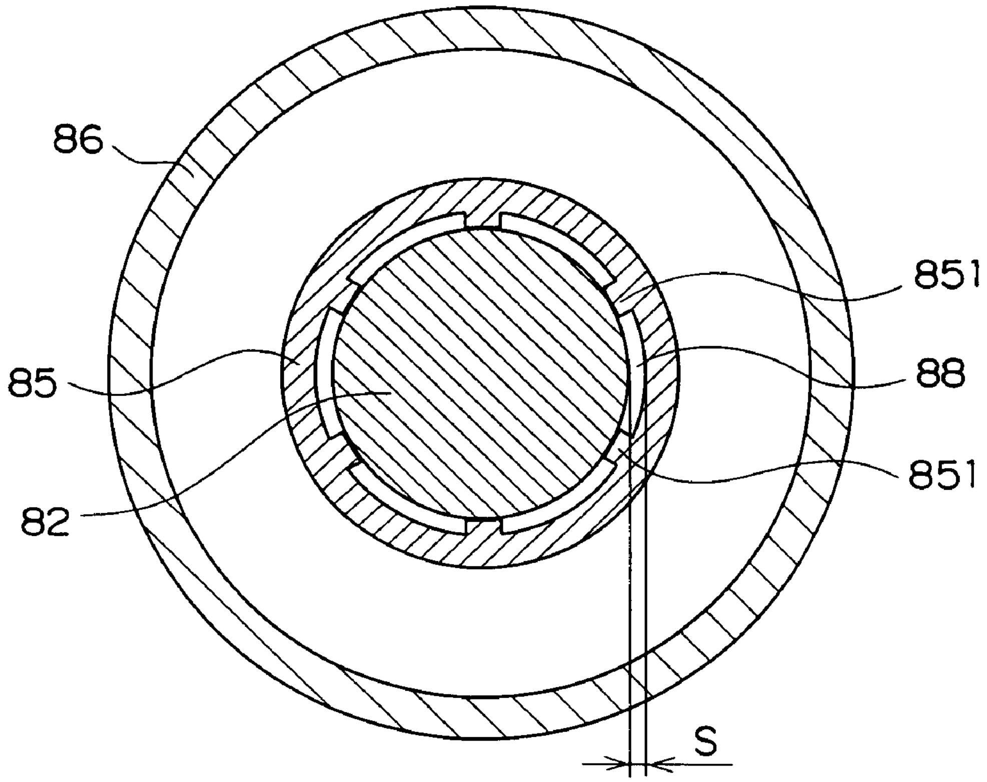
FIG. 20 is an enlarged cross-sectional view along the line G—G in FIG. 16.
Figure 21:
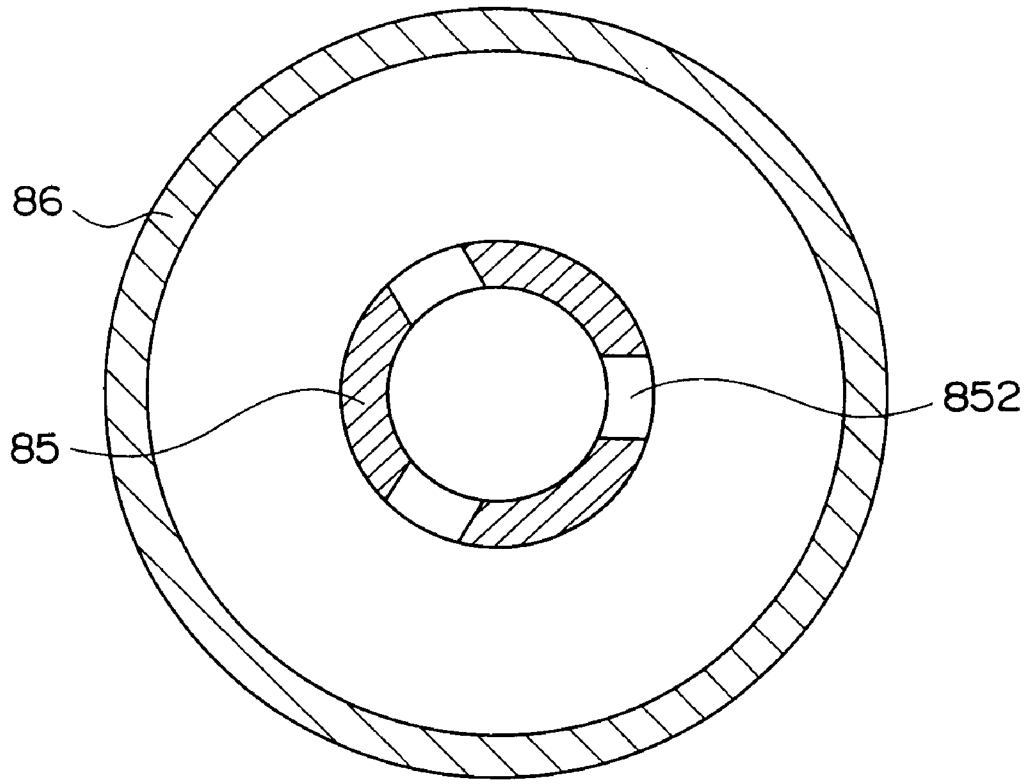
FIG. 21 is an enlarged cross-sectional view along the line H—H in FIG. 16.
Figure 22:
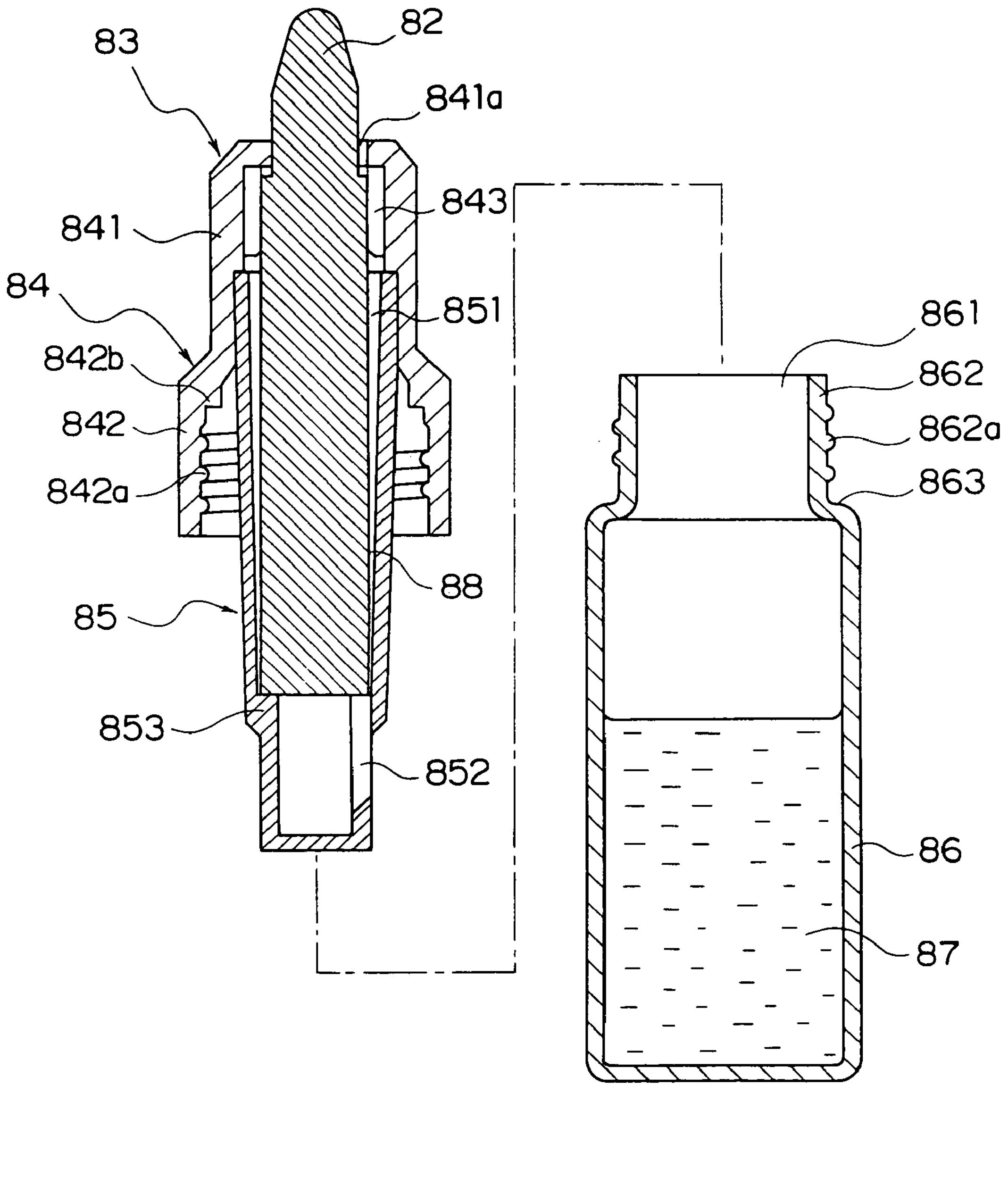
FIG. 22 is a vertical sectional view showing how the writing instrument shown in FIG. 6 stands when its holder is detached from a container.

As shown in FIGS. 19 and 20, at the inner surface of the inner cylinder 85 of the holder 83 (i.e., the inner surface of the pen point holder), a plurality of ribs 851 (six ribs here) extending in the axial direction are provided at equal intervals. The ribs 851 brings the pen point 82 into press-fit hold at its outer surface, and this keeps the pen point 82 from tottering in the diameter direction to enable stable coating or writing. Moreover, since the ribs 851 bring the pen point 82 into press-fit hold at its outer surface, gaps 88 extending in the axial direction, having a capillary force, are formed between the outer surface of the pen point 82 and the inner surface of the inner cylinder 85 in mutual spaces of the ribs 851 adjacent to each other.

The ribs 851 projecting from the inner surface of the inner cylinder 85 are so set as to project in the diameter direction in an extent that becomes smaller toward the rear. Thus, the width S of the gaps 88 in the diameter direction is so set as to become gradually smaller toward the rear. As the result, the capillary force of the gaps 88 is set to become gradually greater toward the rear. Here, stated specifically, the width S in the diameter direction of the gaps 88 is set at 0.3 mm for the one shown in FIG. 19, and 0.15 mm for the one shown in FIG. 20.

The inner cylinder 85 also has a constricted rear end portion. A plurality of communicating holes 852 (three holes here) are made in the sidewall at the rear end portion (FIG. 21) so that the interior of the container 86 communicates with the interior of the inner cylinder 85 (i.e., the rear end of the pen point 82 communicates with the gaps 88) via the communicating holes 852. At the inner surface at a position slightly forward from the rear end of the inner cylinder 85, a stopper rib 853 is provided adjoiningly to the sidewall of the inner cylinder 85 at its rear end portion. The stopper rib 853 comes into contact with the rear end of the pen point 82.

At the front end of the small-diameter portion 841 of the holder 83, a front end opening 841*a* is also provided, and the front end portion of the pen point 82 is projected therefrom. Also, an air hole is formed between the inner surface of the front end opening 841*a* and the outer surface of the front end portion of the pen point 82.

The pen point 82 also has, at the rearward outer surface of its front end portion, an outer diameter set slightly larger than the inner diameter of the front end opening 841*a* so that the pen point 82 can be prevented from coming off from the holder 83. Still also, the pen point 82 is, at the rearward outer surface of its front end portion, held with a plurality of holding ribs 843 (six ribs here) provided at the inner surface of the small-diameter portion 841, thus an air flow path is formed between it and the inner surface of the small-diameter portion 841.

In the above example, the gaps 88 formed between the inner surface of the pen point holding member and the outer surface of the pen point 82 are formed by the ribs 851 provided at the inner surface of the pen point holding member of the holder 83, but may be formed in a different manner, e.g., by ribs (or grooves) provided at the outer surface of the pen point 82.

What is claimed is:

1. A reversible water-metachromatic hand writing toy cloth sheet which comprises a cloth and a water-impermeable sheet on a back of said cloth, said cloth bearing on a front thereof a porous layer comprising a binder resin having fine-particle silicic acid fixed in a dispersed state therein, said water-metachromatic cloth sheet exhibiting different transparency between a water-absorbed state and a water-unabsorbed state, wherein said cloth has a weight per unit area of 30 $g/m^2$ to 1,000 $g/m^2$, the amount of said fine-particle silicic acid in said porous layer is 1 $g/m^2$ to 30 $g/m^2$, and the amount of said fine-particle silicic acid per 1 part by weight of the binder is 0.5 to 2 parts by weight.

2. The reversible water-metachromatic hand writing toy cloth sheet according to claim 1, wherein said fine-particle silicic acid has a two-dimensional structure produced by a wet process and a particle diameter of 0.03 $\mu$m to 10 $\mu$m, and said binder resin is a polyurethane resin.

3. The reversible water-metachromatic hand writing toy cloth sheet according to claim 2, wherein said water-impermeable sheet material is a soft thermoplastic sheet or thermoplastic elastomer having a thickness of from 1 $\mu$M to 3 mm.

4. The reversible water-metachromatic hand writing toy cloth sheet according to claim 3, wherein said cloth is a quadrilateral cut sheet having a side of 50 cm or longer.

5. The reversible water-metachromatic hand writing toy cloth sheet according to claim 1, further comprising a colored layer.

6. A reversible water-metachromatic hand writing toy comprising the reversible water-metachromatic hand writing toy cloth sheet according to claim 1, and means for providing water thereto.

7. The reversible water-metachromatic hand writing toy according to claim 6, wherein said water-providing means is a stamp or a writing instrument having a pen point, said stamp or pen point comprising a synthetic resin porous member or fibrous worked member.

8. The water-metachromatic toy according to claim 7, wherein said means for providing water is said writing instrument, which comprises:

a hollow main body;

a pen point member formed of a synthetic resin porous member or fibrous worked member and fitted to a front end of the main body such that the front end of said pen point projects to the exterior from the main body and extends inwardly into the hollow interior of the main body;

a water absorber held in the hollow interior of said main body, said water absorber being formed of a fiber bunch which is in contact with the rear end of said pen point member to provide water thereto; and means for communicating air between said hollow interior of said main body and the exterior of the same.

9. The water-metachromatic toy according to claim 8, wherein said air communicating means comprises a hole formed through said main body.

10. The water-metachromatic toy according to claim 9, comprising a further communication hole formed through the tip end portion of said main body at a position forward of the tip end of said water absorber.

11. The water-metachromatic toy according to claim 7, wherein said means for providing water is said writing instrument, which comprises:

a cylindrical container capable of holding water therein, the container being formed with an opening at a tip end thereof to communicate the interior of the container with the exterior thereof;

a pen point member formed of a fiber bunch and having a pen point at a tip end thereof and a rod-like body;

a hollow cylindrical holder which directly holds said pen point member, said holder being formed at a tip end thereof with an opening through which the tip end of said pen point member is projected outwardly and at a rear end with a communication hole;

a gap provided between an inner peripheral surface of said cylindrical holder and an outer peripheral surface of the rod-like body of said pen point member for generating a capillary force therebetween; and connecting means for hermetically and firmly connecting a tip end portion of said container and a rear end portion of said holder so that the holder is detachably retained by said container through said opening;

whereby, when said holder is retained to said container by said connecting means, said pen point member, said holder and said container integrally form said writing instrument, and water in the container is supplied through said communication hole of the rear end of said holder to said pen point member, and when said holder is detached from said container, said opening of said container is usable to supply water therethrough into the container.

12. The water-metachromatic toy according to claim 11, wherein a gap is formed between said pen point member and said holder so that, when said holder is fitted in said opening of said container, water is held in said gap by capillary force.

13. The water-metachromatic toy according to claim 11, wherein said connecting means includes thread-engagement portions formed the tip end portion of said container and the rear end portion of said holder.

14. The water-metachromatic toy according to claim 11, wherein said holder includes a first hollow cylindrical body whose tip end is formed with said opening and whose rear end portion is formed with a counterpart of said connecting means, and a second hollow cylindrical member bottomed at a rear end thereof, the second hollow cylindrical member being fixed to the inner periphery of said first cylindrical member and formed with said communication hole at the rear end; and a gap forming means including ribs formed at the inner periphery of said second cylindrical member.

* * * * *

UNITED STATES PATENT AND TRADEMARK OFFICE

CERTIFICATE OF CORRECTION

PATENT NO. : 6,953,345 B1
APPLICATION NO. : 09/679341
DATED : October 11, 2005
INVENTOR(S) : Akio Nakashima et al.

It is certified that error appears in the above-identified patent and that said Letters Patent is hereby corrected as shown below:

COLUMN 16:

Line 44, "brings" should read --bring--.

COLUMN 17:

Line 4, "communicate" should read --communicates--;
Line 8, "swol- " should read --swal- --; and
Line 9, "down" should be deleted.

COLUMN 20:

Line 51, "cloth sheet" should be deleted; and
Line 64, "cloth sheet" should be deleted.

COLUMN 21:

Line 2, "cloth sheet" should be deleted;
Line 7, "cloth sheet" should be deleted;
Line 10, "cloth sheet" should be deleted;
Line 13, "comprising the reversible water-metachromatic hand writing" should be deleted; and
Line 14, "toy cloth sheet" should be deleted and "means" should read --comprising means--.

UNITED STATES PATENT AND TRADEMARK OFFICE

CERTIFICATE OF CORRECTION

PATENT NO. : 6,953,345 B1
APPLICATION NO. : 09/679341
DATED : October 11, 2005
INVENTOR(S) : Akio Nakashima et al.

It is certified that error appears in the above-identified patent and that said Letters Patent is hereby corrected as shown below:

<u>COLUMN 22</u>:

Line 35, "formed" should read --formed at--.

Signed and Sealed this

Nineteenth Day of September, 2006

JON W. DUDAS
*Director of the United States Patent and Trademark Office*